United States Patent
Pelletier et al.

(10) Patent No.: US 9,603,048 B2
(45) Date of Patent: Mar. 21, 2017

(54) RANDOM ACCESS PROCEDURES IN WIRELESS SYSTEMS

(71) Applicant: InterDigital Patent Holdings, Inc., Wilmington, DE (US)

(72) Inventors: Ghyslain Pelletier, Laval (CA); Saad Ahmad, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 13/838,231

(22) Filed: Mar. 15, 2013

(65) Prior Publication Data
US 2013/0242730 A1    Sep. 19, 2013

Related U.S. Application Data

(60) Provisional application No. 61/611,836, filed on Mar. 16, 2012, provisional application No. 61/644,562, (Continued)

(51) Int. Cl.
  H04W 74/00    (2009.01)
  H04W 28/02    (2009.01)
  (Continued)

(52) U.S. Cl.
  CPC ....... *H04W 28/0284* (2013.01); *H04L 1/0046* (2013.01); *H04L 1/0072* (2013.01); *H04W 74/0833* (2013.01)

(58) Field of Classification Search
  CPC . H04W 28/02; H04W 28/0236; H04W 74/08; H04W 74/0841; H04W 74/0858
  (Continued)

(56) References Cited

U.S. PATENT DOCUMENTS

| 6,567,396 B1 * | 5/2003 | Pohjanvouri | H04L 29/12009 370/349 |
| 2003/0095528 A1 * | 5/2003 | Halton | H04W 74/0875 370/342 |

(Continued)

FOREIGN PATENT DOCUMENTS

| EP | 0993214 A1 | 4/2000 |
| EP | 2136599 A1 | 12/2009 |

(Continued)

OTHER PUBLICATIONS

3rd Generation Partnership Project; Technical Specification Group Radio Access Network; Evolved Universal Terrestrial Radio Access (E-UTRA); User Equipment (UE) procedures in idle mode (Release 10), 3GPP TS 36.304 V10.4.0, Dec. 2011, 33 pages.

(Continued)

*Primary Examiner* — Mohamed Kamara
(74) *Attorney, Agent, or Firm* — Condo Roccia Koptiw LLP

(57) ABSTRACT

A wireless transmit/receive unit (WTRU) may detect cell congestion by selecting a preamble type as a function of priority level, transmitting the preamble to a serving cell, receiving a random access response (RAR) from the serving cell, determining a congestion state of the serving cell as a function of the received RAR, and/or responding to the congestion state of the serving cell. RACH functionality may be improved by allocating one or more sets of Physical RACH (PRACH) resources to a WTRU. The WTRU may configure the additional PRACH resources based on the allocation. A WTRU may determine a second set of PRACH resources based at least in part on a first set of PRACH resources. A WTRU may determine additional sets of PRACH preambles and may utilize modified PRACH pre- (Continued)

ambles and/or modified PRACH preamble formats. The WTRU may signal additional PRACH resources.

24 Claims, 20 Drawing Sheets

Related U.S. Application Data filed on May 9, 2012, provisional application No. 61/678,387, filed on Aug. 1, 2012.

(51) Int. Cl.
*H04W 74/08* (2009.01)
*H04L 1/00* (2006.01)

(58) Field of Classification Search
USPC ....... 370/252, 230, 254, 328–329, 315, 342; 455/404.1, 450, 455
See application file for complete search history.

(56) References Cited

U.S. PATENT DOCUMENTS

| | | | | |
|---|---|---|---|---|
| 2010/0195607 A1* | 8/2010 | Lee | H04W 74/0866 | 370/329 |
| 2010/0232318 A1* | 9/2010 | Sarkar | H04W 28/18 | 370/254 |
| 2010/0255867 A1* | 10/2010 | Ishii | H04J 11/0023 | 455/501 |
| 2010/0265906 A1* | 10/2010 | Bucknell | H04L 1/1893 | 370/329 |
| 2010/0278042 A1* | 11/2010 | Monnes | H04L 43/0894 | 370/230 |
| 2010/0296467 A1* | 11/2010 | Pelletier | H04W 74/0833 | 370/329 |
| 2011/0189972 A1* | 8/2011 | Sato | H04W 76/007 | 455/404.1 |
| 2012/0033554 A1* | 2/2012 | Shiva | H04W 28/0205 | 370/235 |
| 2012/0033613 A1* | 2/2012 | Lin | H04W 74/085 | 370/328 |
| 2012/0051297 A1* | 3/2012 | Lee | H04W 74/006 | 370/329 |
| 2012/0063305 A1* | 3/2012 | Chiu | H04W 74/0833 | 370/230 |
| 2012/0069788 A1* | 3/2012 | Shen | H04W 74/006 | 370/315 |

FOREIGN PATENT DOCUMENTS

| | | |
|---|---|---|
| EP | 2352352 A1 | 8/2011 |
| WO | WO 02/062085 A2 | 8/2002 |
| WO | WO 2009/075485 A1 | 6/2009 |
| WO | WO 2010/107354 A1 | 9/2010 |

OTHER PUBLICATIONS

Research in Motion UK Ltd. et al., "LTE RAN Enhancements for Diverse Data Applications", 3GPP TSG RAN Meeting #51, RP-110454, Kansas City, USA, Mar. 15-18, 2011, 7 pages.

3rd Generation Partnership Project (3GPP); "Technical Specification Group Radio Access Network; Evolved Universal Terrestrial Radio Access (E-UTRA); Medium Access Control (MAC) protocol specification (Release 10)", 3GPP TS 36.321 V10.4.0, Dec. 2011, 54 pages.

3rd Generation Partnership Project (3GPP); "Technical Specification Group Radio Access Network; Evolved Universal Terrestrial Radio Access (E-UTRA); Radio Resource Control (RRC); Protocol specification (Release 10)", 3GPP TS 36.331 V10.4.0, Dec. 2011, 296 pages.

$3^{rd}$ Generation Partnership Project (3GPP), 3GPP TS 36.211 V9.1.0, "$3^{rd}$ Generation Partnership Project; Technical Specification Group Radio Access Network; Evolved Universal Terrestrial Radio Access (E-UTRA); Physical Channels and Modulation (Release 9)", Mar. 2010, 85 pages.

\* cited by examiner

```
PRACH-Config ::=        SEQUENCE {
    rootSequenceIndex       INTEGER (0..837),
    prach-ConfigInfo        PRACH-ConfigInfo        OPTIONAL    -- Need ON
}
```

FIG. 5

```
-- ASN1START

RadioResourceConfigCommonSIB ::=    SEQUENCE {
    rach-ConfigCommon               RACH-ConfigCommon,
    bcch-Config                     BCCH-Config,
    pcch-Config                     PCCH-Config,
    prach-Config                    PRACH-ConfigSIB,
    pdsch-ConfigCommon              PDSCH-ConfigCommon,
    pusch-ConfigCommon              PUSCH-ConfigCommon,
    pucch-ConfigCommon              PUCCH-ConfigCommon,
    soundingRS-UL-ConfigCommon      SoundingRS-UL-ConfigCommon,
    uplinkPowerControlCommon        UplinkPowerControlCommon,
    ul-CyclicPrefixLength           UL-CyclicPrefixLength,
    ...,
    [[ uplinkPowerControlCommon-v10x0   UplinkPowerControlCommon-v10x0,  OPTIONAL-- Need OR
       prach-Config-v12x0               PRACH-Config-lowPric-v12x0       Need OR
    ]]
}

RadioResourceConfigCommon ::=       SEQUENCE {
    rach-ConfigCommon               RACH-ConfigCommon               OPTIONAL,  -- Need ON
    prach-Config                    PRACH-Config,
    pdsch-ConfigCommon              PDSCH-ConfigCommon              OPTIONAL,  -- Need ON
    pusch-ConfigCommon              PUSCH-ConfigCommon,
    phich-Config                    PHICH-Config                    OPTIONAL,  -- Need ON
    pucch-ConfigCommon              PUCCH-ConfigCommon              OPTIONAL,  -- Need ON
    soundingRS-UL-ConfigCommon      SoundingRS-UL-ConfigCommon      OPTIONAL,  -- Need ON
    uplinkPowerControlCommon        UplinkPowerControlCommon        OPTIONAL,  -- Need ON
    antennaInfoCommon               AntennaInfoCommon               OPTIONAL,  -- Need ON
    p-Max                           P-Max                           OPTIONAL,  -- Need OP
    tdd-Config                      TDD-Config                      OPTIONAL,  -- Cond TDD
    ul-CyclicPrefixLength           UL-CyclicPrefixLength,
    ...,
    [[ uplinkPowerControlCommon-v10x0   UplinkPowerControlCommon-v10x0,  OPTIONAL-- Need ON
       prach-Config-v12x0               PRACH-Config-lowPric-v12x0       OPTIONAL-- Need ON
    ]]
}
```

```
-- ASN1START

PRACH-ConfigSIB ::=             SEQUENCE {
    rootSequenceIndex               INTEGER (0..837),
    prach-ConfigInfo                PRACH-ConfigInfo
}

PRACH-Config ::=                SEQUENCE {
    rootSequenceIndex               INTEGER (0..837),
    prach-ConfigInfo                PRACH-ConfigInfo                    OPTIONAL -- Need ON
}

PRACH-Config-lowPrio-v12x0 ::=  SEQUENCE {
    prach-ConfigIndex               INTEGER (0..63),                    OPTIONAL -- Need ON
    prach-FreqOffset                INTEGER (0..94)                     OPTIONAL -- Need ON
}

PRACH-ConfigSCell-r10 ::=       SEQUENCE {
    prach-ConfigIndex               INTEGER (0..63)
}

PRACH-ConfigInfo ::=            SEQUENCE {
    prach-ConfigIndex               INTEGER (0..63),
    highSpeedFlag                   BOOLEAN,
    zeroCorrelationZoneConfig       INTEGER (0..15),
    prach-FreqOffset                INTEGER (0..94)
}

-- ASN1STOP
```

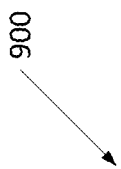

FIG. 9

```
-- ASN1START

RadioResourceConfigCommonSIB ::=   SEQUENCE {
    rach-ConfigCommon                   RACH-ConfigCommon,
    bcch-Config                         BCCH-Config,
    pcch-Config                         PCCH-Config,
    prach-Config                        PRACH-ConfigSIB,
    pdsch-ConfigCommon                  PDSCH-ConfigCommon,
    pusch-ConfigCommon                  PUSCH-ConfigCommon,
    pucch-ConfigCommon                  PUCCH-ConfigCommon,
    soundingRS-UL-ConfigCommon          SoundingRS-UL-ConfigCommon,
    uplinkPowerControlCommon            UplinkPowerControlCommon,
    ul-CyclicPrefixLength               UL-CyclicPrefixLength,
    ...,
    [[ uplinkPowerControlCommon-v10x0   UplinkPowerControlCommon-v10x0    OPTIONAL -- Need OR
    ]]
}

RadioResourceConfigCommon ::=   SEQUENCE {
    rach-ConfigCommon                   RACH-ConfigCommon                 OPTIONAL, -- Need ON
    prach-Config                        PRACH-Config,
    pdsch-ConfigCommon                  PDSCH-ConfigCommon                OPTIONAL, -- Need ON
    pusch-ConfigCommon                  PUSCH-ConfigCommon,
    phich-Config                        PHICH-Config                      OPTIONAL, -- Need ON
    pucch-ConfigCommon                  PUCCH-ConfigCommon                OPTIONAL, -- Need ON
    soundingRS-UL-ConfigCommon          SoundingRS-UL-ConfigCommon        OPTIONAL, -- Need ON
    uplinkPowerControlCommon            UplinkPowerControlCommon          OPTIONAL, -- Need ON
    antennaInfoCommon                   AntennaInfoCommon                 OPTIONAL, -- Need ON
    p-Max                               P-Max                             OPTIONAL, -- Need OP
    tdd-Config                          TDD-Config                        OPTIONAL, -- Cond TDD
    ul-CyclicPrefixLength               UL-CyclicPrefixLength,
    ...,
    [[ uplinkPowerControlCommon-v10x0   UplinkPowerControlCommon-v10x0    OPTIONAL -- Need ON
       prach-Config-Dual-v12x0          BOOLEAN                           OPTIONAL -- Need ON
    ]]
}
```

```
-- ASN1START

RadioResourceConfigCommonSIB ::=   SEQUENCE {
    rach-ConfigCommon                   RACH-ConfigCommon,
    bcch-Config                         BCCH-Config,
    pcch-Config                         PCCH-Config,
    prach-Config                        PRACH-ConfigSIB,
    pdsch-ConfigCommon                  PDSCH-ConfigCommon,
    pusch-ConfigCommon                  PUSCH-ConfigCommon,
    pucch-ConfigCommon                  PUCCH-ConfigCommon,
    soundingRS-UL-ConfigCommon          SoundingRS-UL-ConfigCommon,
    uplinkPowerControlCommon            UplinkPowerControlCommon,
    ul-CyclicPrefixLength               UL-CyclicPrefixLength,
    ...,
    [[ uplinkPowerControlCommon-v10x0   UplinkPowerControlCommon-v10x0      OPTIONAL-- Need OR
    ]]
}

RadioResourceConfigCommon ::=      SEQUENCE {
    rach-ConfigCommon                   RACH-ConfigCommon                   OPTIONAL, -- Need ON
    prach-Config                        PRACH-Config,
    pdsch-ConfigCommon                  PDSCH-ConfigCommon                  OPTIONAL, -- Need ON
    pusch-ConfigCommon                  PUSCH-ConfigCommon,
    phich-Config                        PHICH-Config                        OPTIONAL, -- Need ON
    pucch-ConfigCommon                  PUCCH-ConfigCommon                  OPTIONAL, -- Need ON
    soundingRS-UL-ConfigCommon          SoundingRS-UL-ConfigCommon          OPTIONAL, -- Need ON
    uplinkPowerControlCommon            UplinkPowerControlCommon            OPTIONAL, -- Need ON
    antennaInfoCommon                   AntennaInfoCommon                   OPTIONAL, -- Need ON
    p-Max                               P-Max                               OPTIONAL, -- Need OP
    tdd-Config                          TDD-Config                          OPTIONAL, -- Cond TDD
    ul-CyclicPrefixLength               UL-CyclicPrefixLength,
    ...,
    [[ uplinkPowerControlCommon-v10x0   UplinkPowerControlCommon-v10x0,     OPTIONAL-- Need ON
       prach-Config-v12x0               PRACH-Config                                  -- Need ON
    ]]
}
```

```
-- ASN1START

PRACH-ConfigSIB ::=               SEQUENCE {
    rootSequenceIndex                 INTEGER (0..837),
    prach-ConfigInfo                  PRACH-ConfigInfo
}

PRACH-Config ::=                  SEQUENCE {
    rootSequenceIndex                 INTEGER (0..837),
    prach-ConfigInfo                  PRACH-ConfigInfo                  OPTIONAL -- Need ON
}

PRACH-Config-v12x0 ::=            SEQUENCE {
    rootSequenceIndex                 INTEGER (0..837),
    prach-ConfigInfo-v12x0            PRACH-ConfigInfo                  OPTIONAL -- Need ON
}

PRACH-ConfigSCell-r10 ::=         SEQUENCE {
    prach-ConfigIndex                 INTEGER (0..63)
}

PRACH-ConfigInfo ::=              SEQUENCE {
    prach-ConfigIndex                 INTEGER (0..63),
    highSpeedFlag                     BOOLEAN,
    zeroCorrelationZoneConfig         INTEGER (0..15),
    prach-FreqOffset                  INTEGER (0..94)
}

PRACH-ConfigInfo ::=              SEQUENCE {
    prach-ConfigIndex                 INTEGER (0..127),
    highSpeedFlag                     BOOLEAN,
    zeroCorrelationZoneConfig         INTEGER (0..15),
    prach-FreqOffset                  INTEGER (0..94)
}

-- ASN1STOP
```

FIG. 12

-- ASN1START

```
RadioResourceConfigCommonSIB ::=        SEQUENCE {
    rach-ConfigCommon                       RACH-ConfigCommon,
    bcch-Config                             BCCH-Config,
    pcch-Config                             PCCH-Config,
    prach-Config                            PRACH-ConfigSIB,
    pdsch-ConfigCommon                      PDSCH-ConfigCommon,
    pusch-ConfigCommon                      PUSCH-ConfigCommon,
    pucch-ConfigCommon                      PUCCH-ConfigCommon,
    soundingRS-UL-ConfigCommon              SoundingRS-UL-ConfigCommon,
    uplinkPowerControlCommon                UplinkPowerControlCommon,
    ul-CyclicPrefixLength                   UL-CyclicPrefixLength,
    ...,
    [[ uplinkPowerControlCommon-v10x0       UplinkPowerControlCommon-v10x0,    OPTIONAL,-- Need OR
       prach-Config-v12x0                   PRACH-Config-v12x0                 OPTIONAL-- Need OR
    ]]
}

RadioResourceConfigCommon ::=           SEQUENCE {
    rach-ConfigCommon                       RACH-ConfigCommon                  OPTIONAL,-- Need ON
    prach-Config                            PRACH-Config,
    pdsch-ConfigCommon                      PDSCH-ConfigCommon                 OPTIONAL, -- Need ON
    pusch-ConfigCommon                      PUSCH-ConfigCommon,
    phich-Config                            PHICH-Config                       OPTIONAL,-- Need ON
    pucch-ConfigCommon                      PUCCH-ConfigCommon                 OPTIONAL,-- Need ON
    soundingRS-UL-ConfigCommon              SoundingRS-UL-ConfigCommon         OPTIONAL,-- Need ON
    uplinkPowerControlCommon                UplinkPowerControlCommon           OPTIONAL,-- Need ON
    antennaInfoCommon                       AntennaInfoCommon                  OPTIONAL,-- Need ON
    p-Max                                   P-Max                              OPTIONAL,-- Need OP
    tdd-Config                              TDD-Config                         OPTIONAL,-- Cond TDD
    ul-CyclicPrefixLength                   UL-CyclicPrefixLength,
    ...,
    [[ uplinkPowerControlCommon-v10x0       UplinkPowerControlCommon-v10x0,    OPTIONAL,-- Need ON
       prach-Config-v12x0                   PRACH-Config-v12x0                 OPTIONAL-- Need ON
    ]]
}
```

```
-- ASN1START

PRACH-ConfigSIB ::=              SEQUENCE {
    rootSequenceIndex                INTEGER (0..837),
    prach-ConfigInfo                 PRACH-ConfigInfo
}

PRACH-Config ::=                 SEQUENCE {
    rootSequenceIndex                INTEGER (0..837),
    prach-ConfigInfo                 PRACH-ConfigInfo                    OPTIONAL -- Need ON
}

PRACH-Config-v12x0 ::=           SEQUENCE {
    prach-ConfigInfo-v12x0           PRACH-ConfigInfo                    OPTIONAL -- Need ON
}

PRACH-ConfigSCell-r10 ::=        SEQUENCE {
    prach-ConfigIndex                INTEGER (0..63)
}

PRACH-ConfigInfo ::=             SEQUENCE {
    prach-ConfigIndex                INTEGER (0..63),
    highSpeedFlag                    BOOLEAN,
    zeroCorrelationZoneConfig        INTEGER (0..15),
    prach-FreqOffset                 INTEGER (0..94)
}

PRACH-ConfigInfo-v12x0 ::=       SEQUENCE {
    prach-ConfigIndex                INTEGER (0..63),
    prach-ConfigIndex-lowPrio        INTEGER (0..63),
    highSpeedFlag                    BOOLEAN,
    zeroCorrelationZoneConfig        INTEGER (0..15),
    prach-FreqOffset                 INTEGER (0..94),
    prach-FreqOffset-lowPrio         INTEGER (0..94)                     OPTIONAL -- Need ON
                                                                         OPTIONAL -- Need ON
}

-- ASN1STOP
```

```
-- ASN1START

RadioResourceConfigCommonSIB ::=    SEQUENCE {
    rach-ConfigCommon           RACH-ConfigCommon,
    bcch-Config                 BCCH-Config,
    pcch-Config                 PCCH-Config,
    prach-Config                PRACH-ConfigSIB,
    pdsch-ConfigCommon          PDSCH-ConfigCommon,
    pusch-ConfigCommon          PUSCH-ConfigCommon,
    pucch-ConfigCommon          PUCCH-ConfigCommon,
    soundingRS-UL-ConfigCommon  SoundingRS-UL-ConfigCommon,
    uplinkPowerControlCommon    UplinkPowerControlCommon,
    ul-CyclicPrefixLength       UL-CyclicPrefixLength,
    ...,
    [[ uplinkPowerControlCommon-v10x0  UplinkPowerControlCommon-v10x0, OPTIONAL,-- Need OR
       prach-Config-lowPrio-v12x0      PRACH-Config-lowPrio-v12x0      OPTIONAL-- Need OR
    ]]
}

RadioResourceConfigCommon ::=       SEQUENCE {
    rach-ConfigCommon           RACH-ConfigCommon,
    prach-Config                PRACH-Config,
    pdsch-ConfigCommon          PDSCH-ConfigCommon,
    pusch-ConfigCommon          PUSCH-ConfigCommon,
    phich-Config                PHICH-Config,
    pucch-ConfigCommon          PUCCH-ConfigCommon,
    soundingRS-UL-ConfigCommon  SoundingRS-UL-ConfigCommon,
    uplinkPowerControlCommon    UplinkPowerControlCommon,
    antennaInfoCommon           AntennaInfoCommon,
    p-Max                       P-Max                       OPTIONAL,   -- Need OP
    tdd-Config                  TDD-Config                  OPTIONAL,   -- Cond TDD
    ul-CyclicPrefixLength       UL-CyclicPrefixLength,
    ...,
    [[ uplinkPowerControlCommon-v10x0  UplinkPowerControlCommon-v10x0, OPTIONAL-- Need ON
       prach-Config-lowPrio-v12x0      PRACH-Config-lowPrio-v12x0      OPTIONAL-- Need ON
    ]]
}
```

```
-- ASN1START

PRACH-ConfigSIB ::=            SEQUENCE {
    rootSequenceIndex              INTEGER (0..837),
    prach-ConfigInfo               PRACH-ConfigInfo
}

PRACH-Config ::=               SEQUENCE {
    rootSequenceIndex              INTEGER (0..837),
    prach-ConfigInfo               PRACH-ConfigInfo                OPTIONAL -- Need ON
}

PRACH-Config-low-Prio-v12x0 ::= SEQUENCE {
    prach-TimeOffset               INTEGER (0..9),
    prach-FreqOffset               INTEGER (0..3)
}

PRACH-ConfigSCell-r10 ::=      SEQUENCE {
    prach-ConfigIndex              INTEGER (0..63)
}

PRACH-ConfigInfo ::=           SEQUENCE {
    prach-ConfigIndex              INTEGER (0..63),
    highSpeedFlag                  BOOLEAN,
    zeroCorrelationZoneConfig      INTEGER (0..15),                OPTIONAL -- Need ON
    prach-FreqOffset               INTEGER (0..94)                 OPTIONAL -- Need ON
}

-- ASN1STOP
```

RANDOM ACCESS PROCEDURES IN WIRELESS SYSTEMS

CROSS-REFERENCE TO RELATED APPLICATIONS

This application claims the benefit of U.S. Provisional Patent Application No. 61/611,836, filed Mar. 16, 2012; U.S. Provisional Patent Application No. 61/644,562, filed May 9, 2012; and U.S. Provisional Patent Application No. 61/678,387, filed on Aug. 1, 2012; the contents of which are hereby incorporated by reference herein.

FIELD

This disclosure is generally related to wireless communications.

BACKGROUND

Random Access Channel (RACH) resources may be utilized by wireless transmit/receive units (WTRUs) to perform uplink transmissions in either a contention based or contention free manner. RACH procedures and resources may be used to request resources and/or to facilitate uplink timing alignment.

SUMMARY

Methods and devices for indicating random access procedure priority and/or detecting of cell congestion by a wireless transmit/receive unit (WTRU) are disclosed. Example methods may include selecting a preamble type as a function of priority level, transmitting the preamble to a serving cell, receiving a random access response (RAR) from the serving cell, determining a congestion state of the serving cell as a function of the received RAR, and/or responding to the congestion state of the serving cell.

Systems and methods are disclosed for improving RACH functionality. For example, one or more sets of Physical RACH (PRACH) resources may be allocated to a WTRU. The WTRU may configure the additional PRACH resources based on the allocation. A WTRU may determine a second set of PRACH resources, for example, based at least in part on a first set of PRACH resources. The sets of PRACH resources may or may not overlap. A WTRU may determine additional sets of PRACH preambles and may utilize modified PRACH preambles and/or modified PRACH preamble formats. Methods for signalling additional PRACH resources are disclosed. A WTRU may be configured to handle RACH failure on a second set of PRACH resources.

BRIEF DESCRIPTION OF THE DRAWINGS

A more detailed understanding may be had from the following description, given by way of example in conjunction with the accompanying drawings wherein:

FIG. 5 illustrates an example PRACH configuration information element (IE);

FIG. 8 illustrates an example PRACH configuration IE;

FIG. 9 illustrates an example PRACH configuration IE;

FIG. 10 illustrates an example PRACH configuration IE;

FIG. 11 illustrates an example PRACH configuration IE;

FIG. 12 illustrates an example PRACH configuration IE;

FIG. 13 illustrates an example PRACH configuration IE;

FIG. 14 illustrates an example PRACH configuration IE;

FIG. 15 illustrates an example PRACH configuration IE; and

FIG. 16 illustrates an example PRACH configuration IE.

DETAILED DESCRIPTION

A detailed description of illustrative examples will now be described with reference to the various Figures. Although this description provides a detailed example of possible implementations, it should be noted that the details are intended to be exemplary and in no way limit the scope of the application.

Figure 1A:
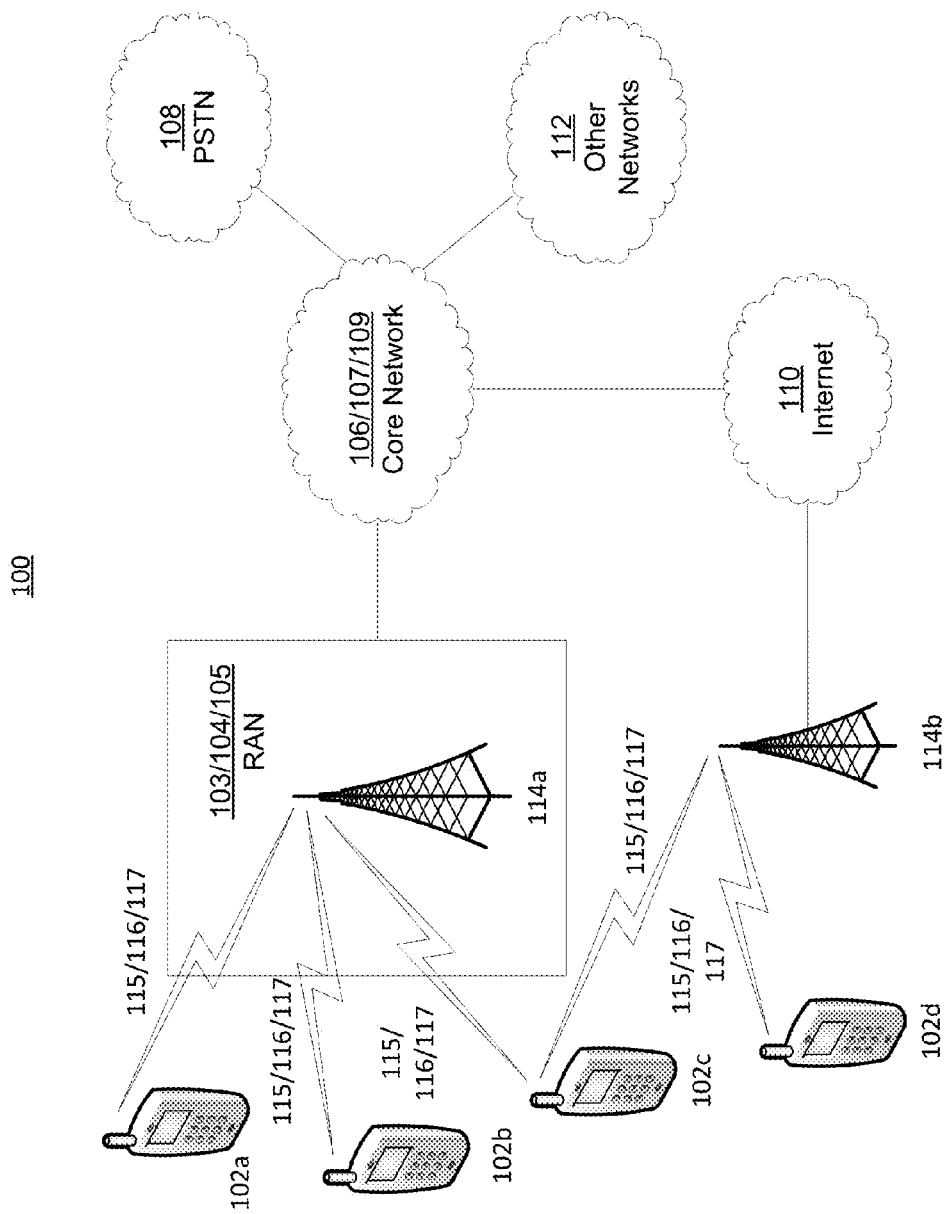
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 115/116/117 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication. Although not shown in FIG. 1A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
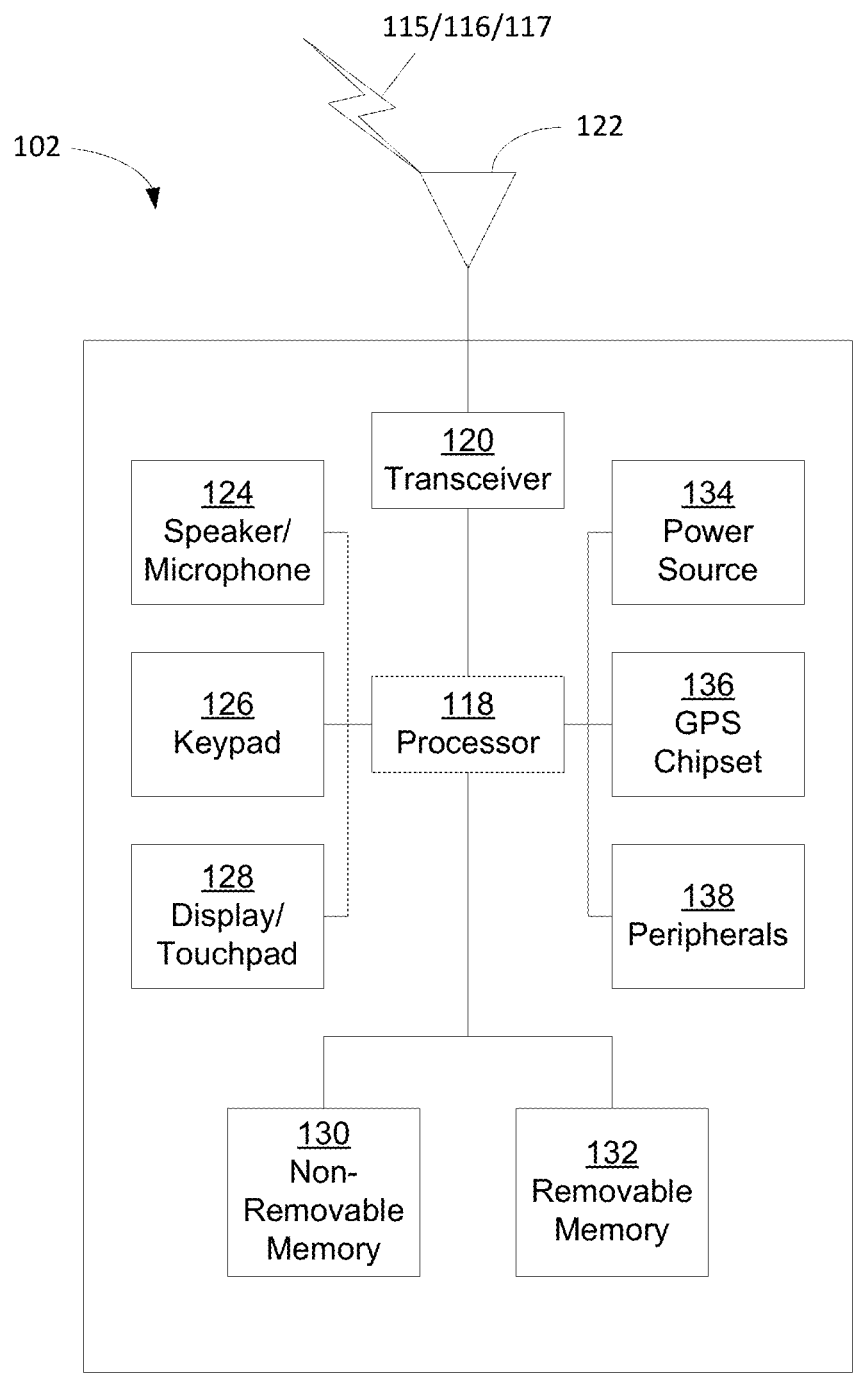
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that may not be physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
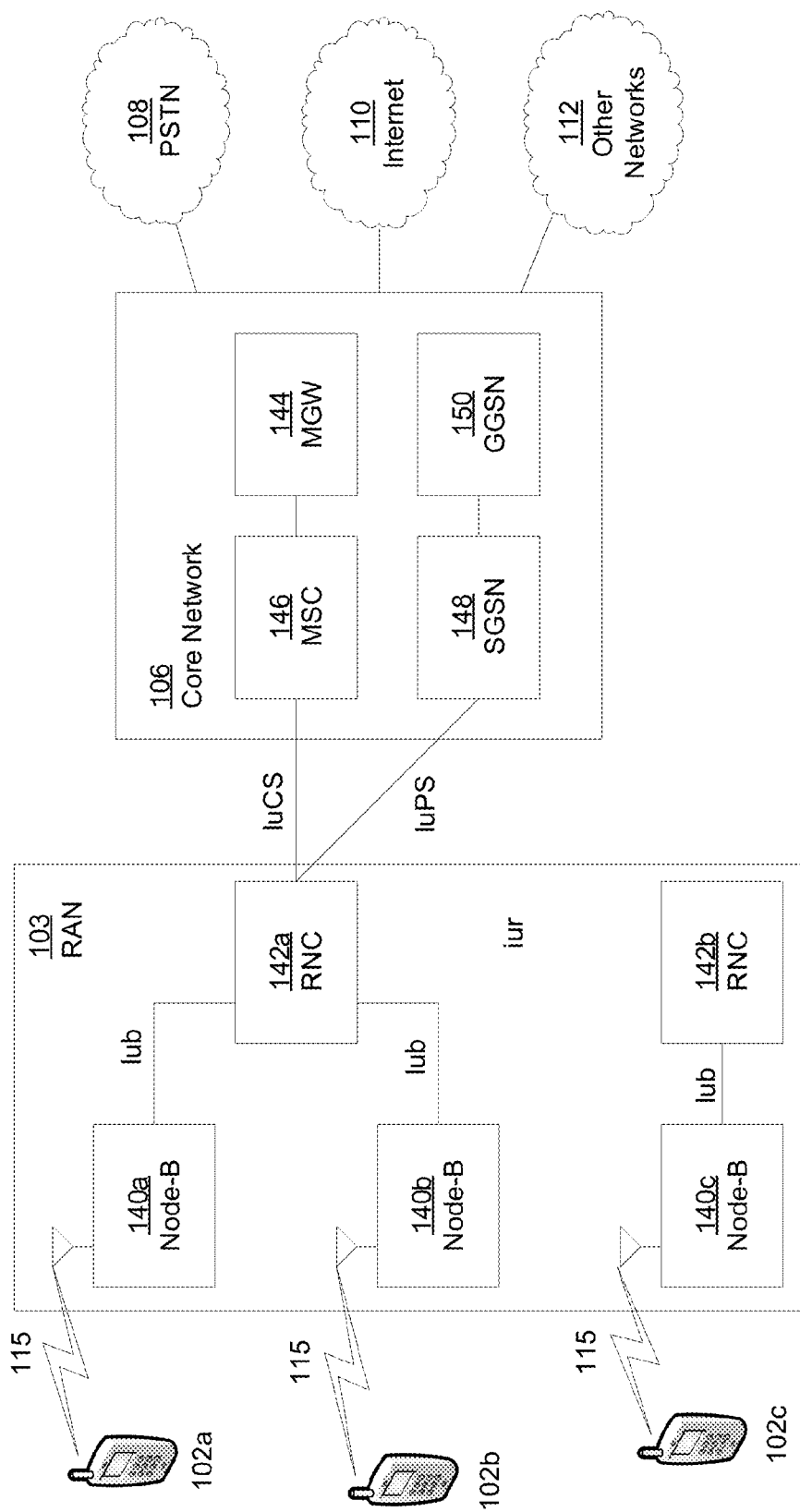
FIG. 1C is a system diagram of an example radio access network and an example core network that may be used within the communications system illustrated in FIG. 1A.

FIG. 1C is a system diagram of the RAN 103 and the core network 106 according to an embodiment. As noted above, the RAN 103 may employ a UTRA radio technology to communicate with the WTRUs 102a, 102b, 102c over the air interface 115. The RAN 103 may also be in communication with the core network 106. As shown in FIG. 1C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
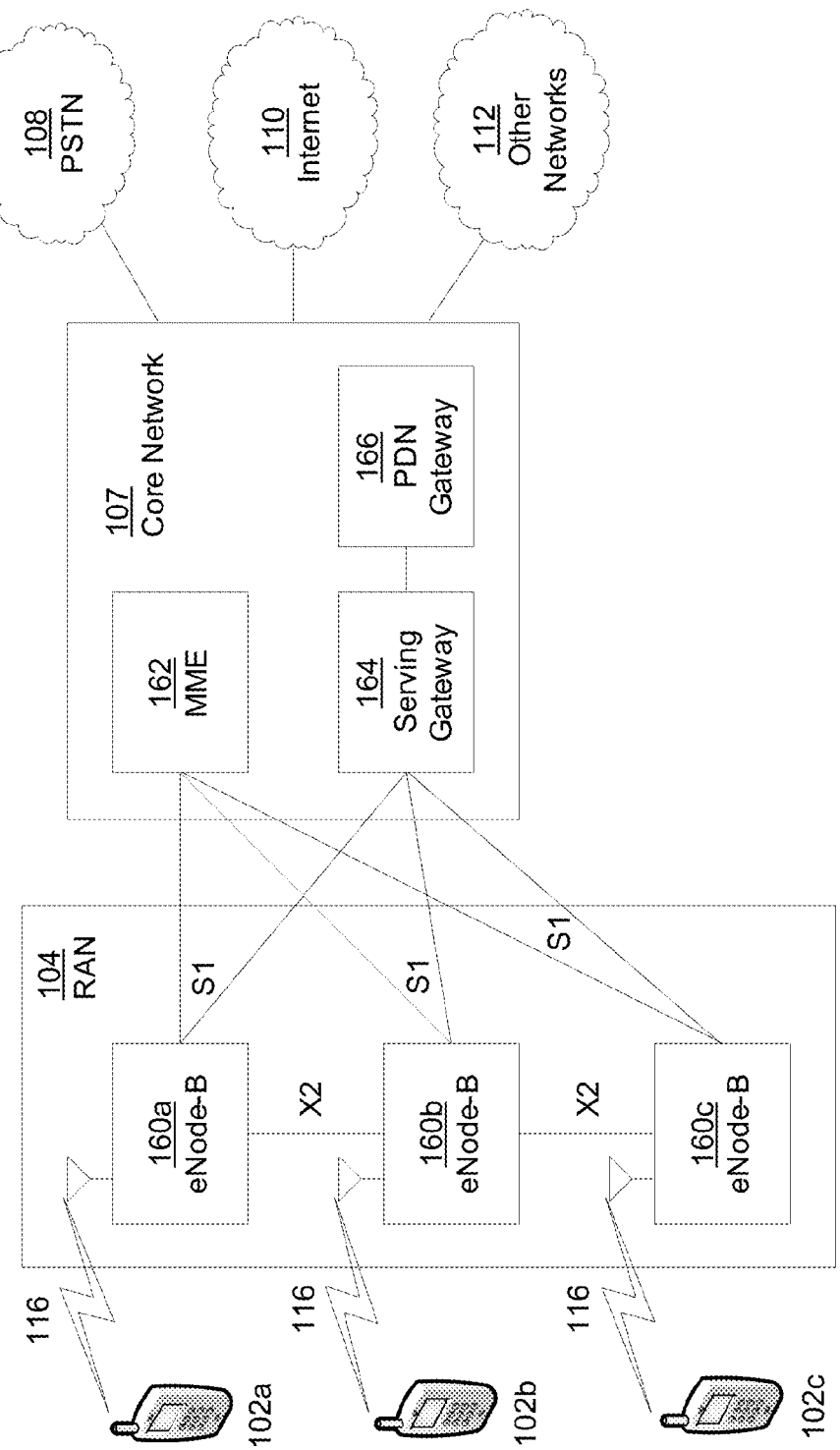
FIG. 1D is a system diagram of an another example radio access network and another example core network that may be used within the communications system illustrated in FIG. 1A.

FIG. 1D is a system diagram of the RAN 104 and the core network 107 according to an embodiment. As noted above, the RAN 104 may employ an E-UTRA radio technology to communicate with the WTRUs 102a, 102b, 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, 160c may be associated with a particular cell (not shown) and may be configured to handle radio resource management decisions, handover decisions, scheduling of users in the uplink and/or downlink, and the like. As shown in FIG. 1D, the eNode-Bs 160a, 160b, 160c may communicate with one another over an X2 interface.

The core network 107 shown in FIG. 1D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 1E:
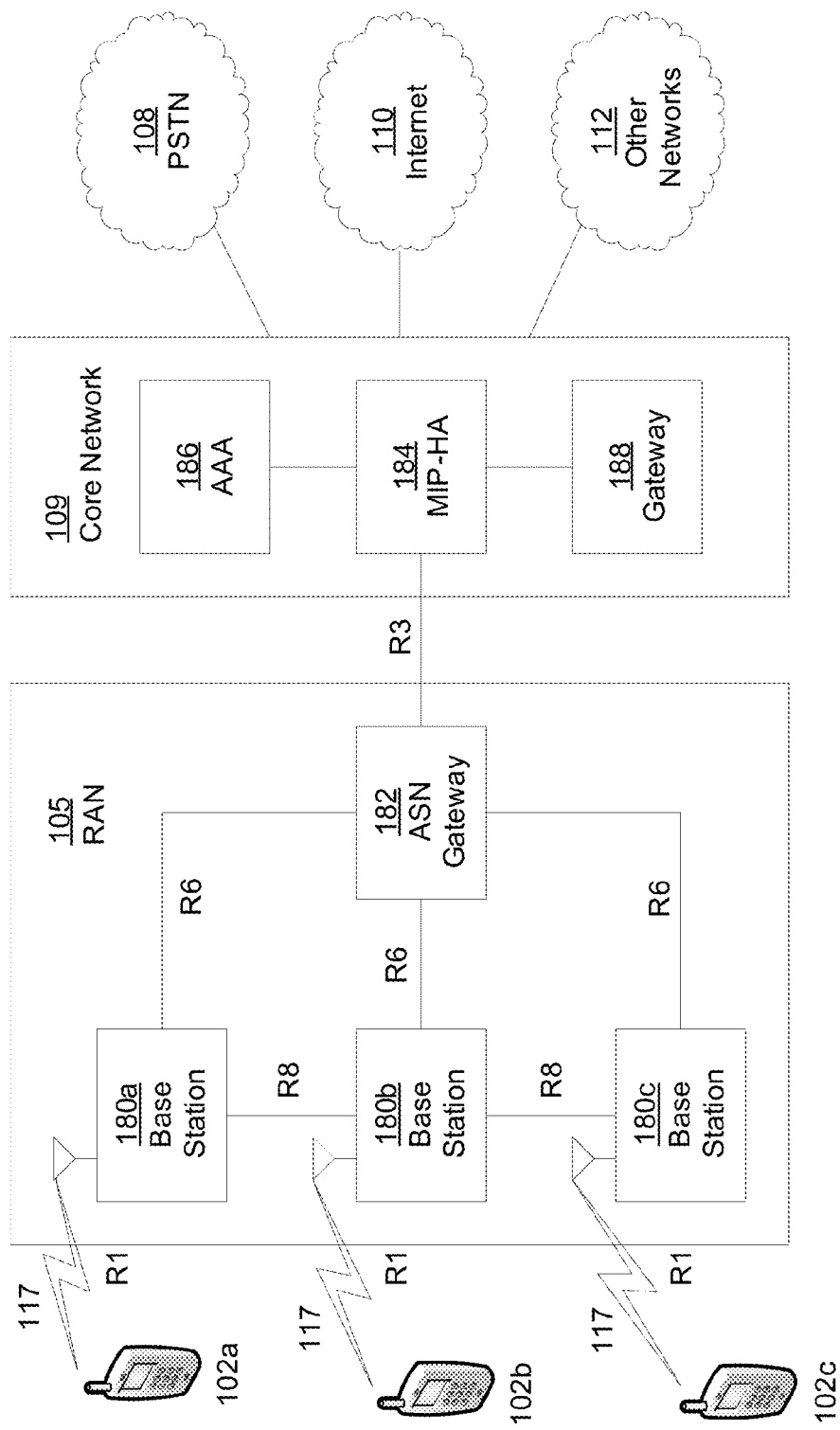
FIG. 1E is a system diagram of an another example radio access network and another example core network that may be used within the communications system illustrated in FIG. 1A.

FIG. 1E is a system diagram of the RAN 105 and the core network 109 according to an embodiment. The RAN 105 may be an access service network (ASN) that employs IEEE 802.16 radio technology to communicate with the WTRUs 102a, 102b, 102c over the air interface 117. As will be further discussed below, the communication links between the different functional entities of the WTRUs 102a, 102b, 102c, the RAN 105, and the core network 109 may be defined as reference points.

As shown in FIG. 1E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell (not shown) in the RAN 105 and may each include one or more transceivers for communicating with the WTRUs 102a, 102b, 102c over the air interface 117. In one embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 1E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 1E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

According to various disclosed examples, a WTRU may associate different physical random access channel (PRACH) resources and/or formats with different random access channel (RACH) functions when triggering a RACH procedure. For example, a WTRU may determine what PRACH resource/format/occasion to use for the transmission of a preamble in a cell when multiple sets of PRACH resources may be configured. As an example, a first PRACH configuration (e.g., first set of PRACH resources) may be used for a first set of functions (and/or a first traffic priority) and a second PRACH configuration (e.g., second set of PRACH resources) may be used for a second set of functions (and/or a second traffic priority). The first set of PRACH resources may be common to the WTRUs within a cell and/or may be used for a random access scheduling request that may be determined to be a high priority request. Examples of functions that may be associated with a high priority request may include one or more of control plane signaling, VoIP or interactive applications, an application with high QoS requirements, emergency call signaling, etc. The second set of PRACH resources may be specific to a subset (e.g., one or more) WTRUs in a cell and/or may be used for a random access scheduling request that is determined to be a lower priority request. Examples of functions that may be associated with a lower priority request may include one or more of best effort background traffic, highly delay tolerant packets, delay tolerant control signaling, etc.

In an example, a mobile terminal (e.g., WTRU) may configure PRACH resources by performing one or more of multiplexing PRACH resources in the time domain using a plurality of prach-ConfigIndex IE(s), multiplexing PRACH resources in the frequency domain using a plurality of prach-FreqOffset Information Elements (IEs), and/or a combination of time domain multiplexing and frequency domain multiplexing of PRACH resources. A WTRU may be configured to determine a second set of PRACH resources as a function of one or more of the PRACH configuration, the SFN, the start of the DRX on-duration, a semi-static PRACH Mask Index, the DRX On-Duration period, the DRX Active Time, the PRACH occasion used for initial preamble transmission, the configured density, and/or the like. A WTRU may be configured to determine a corresponding set of resources in case of resource overlap. A WTRU may be configured to determine a second set of PRACH preambles, wherein the second set may utilize a second rootSequenceIndex, the second set may utilize a grouping of preambles of a first set, and/or the second set may define more (or less) than 64 preambles (e.g., longer $T_{seq}$ or different coding). A WTRU may be configured to extend a preamble format with additional uplink information. A WTRU may be configured to utilize PRACH resources with different preamble formats.

A WTRU may be configured to implement failure procedures for handling RACH failure on a second set of PRACH resources. For example, the WTRU may be configured to handle RACH failure on a second set of PRACH resources when uplink radio link failure (RLF) may not have occurred (e.g., the PRACH failure may be due to congestion handling). A WTRU may be configured to revert to RACH on using a first PRACH configuration (e.g., using normal/legacy random access scheduling) based at on whether or not UL RLF has occurred.

A WTRU may be configured to receive an indication regarding additional PRACH resources. For example, a WTRU may receive one or more of a configuration with multiple PRACH-Config Information Elements (IEs) for a given cell, a configuration with multiple PRACH-Config-Info IEs for a PRACH-Config IE, a configuration with multiple prach-ConfigIndex IEs for a PRACH-ConfigInfo IE, a configuration with multiple prach-FreqOffset IEs for a PRACH-ConfigInfo IE, a configuration with a new PRACH-ConfigDedicated-LowPrioSR IE that may include one or more of the previously listed configurations, and/or any combination thereof. The configurations may be WTRU-specific (e.g., for WTRUs in a RRC_CONNECTED mode) or may be cell-specific (e.g., for WTRUs in a RRC_IDLE mode).

3GPP LTE Release 8/9 may support up to 100 Mbps in the downlink (DL) and/or may support 50 Mbps in the uplink (UL) for a 2×2 MIMO (e.g., Multiple Input-Multiple Output) antenna configuration. The LTE downlink transmission scheme may be based on an orthogonal frequency divisional multiple access (OFDMA) air interface. For the purpose of flexible deployment, LTE R8/9 systems may support scalable transmission bandwidths. For example, a WTRU may be configured to support one or more of 1.4, 2.5, 5, 10, 15 or 20 MHz.

For example, each radio frame (e.g., 10 ms) may include 10 equally sized subframes, each with a duration of 1 ms. Each subframe may include two equally sized timeslots with a 0.5 ms duration. There may be 6 or 7 orthogonal frequency division multiplexing (OFDM) symbols per timeslot. For example, seven OFDM symbols may be used for timeslot including a normal cyclic prefix length, and six OFDM symbols per timeslot may be used in a system configuration that utilizes an extended cyclic prefix. The subcarrier spacing for the LTE R8/9 system may be 15 kHz. A reduced subcarrier spacing mode using 7.5 kHz is may also be utilized.

A resource element (RE) may correspond to a single subcarrier during a single OFDM symbol interval. Twelve consecutive subcarriers during a 0.5 ms timeslot may correspond to one resource block (RB). Therefore, with seven OFDM symbols per timeslot, each RB may include 12*7=84 REs. A DL carrier may include a scalable number of resource blocks, for example, ranging from six RBs to 110 RBs. A range of 6-110 RBs may correspond to an overall scalable transmission bandwidth of roughly 1 MHz up to 20 MHz. In an example, a set of common transmission bandwidths may be specified, for example over 1.4, 3, 5, 10 or 20 MHz.

In an example, the basic time-domain unit that may be used for dynamic scheduling may be one subframe that may include two consecutive timeslots. Resource blocks corresponding to the same frequency domain resources in the two slots of the subframe may be referred to as a resource-block pair. Certain subcarriers on some OFDM symbols may be allocated to carry pilot signals in the time-frequency grid. In an example, a certain number of subcarriers at the edges of the transmission bandwidth may be refrained from being utilized for transmission in order to comply with spectral mask configurations. LTE may support Frequency Division Duplex (hereinafter FDD or frame structure 1) and/or Time Division Duplex (hereinafter TDD or frame structure 2).

LTE-Advanced with Carrier Aggregation (e.g., LTE R10+) is an evolution that aims to improve data rates of single carrier LTE R8/9/10+ using, among other methods, bandwidth extensions also referred to as Carrier Aggregation (CA). With CA, a WTRU may transmit and/or receive simultaneously over the Physical Uplink Shared Channel (PUSCH) and/or the Physical Downlink Shared Channel (PDSCH) of multiple Secondary serving Cells (SCells). For example, one or more SCells may be utilized for transmission and/or reception in addition to a Primary serving Cell (PCell). For example, carrier aggregation of 4 SCells with the PCell may support flexible bandwidth assignments up to 100 MHz.

The control information for the scheduling of PDSCH and PUSCH may be sent on one or more Physical Downlink Control Channel(s) (PDCCH(s)). For example, in addition to the "straight" scheduling using one PDCCH for a pair of UL and DL carriers in a given cell, cross-carrier scheduling may also be supported for a given PDCCH. Cross-carrier scheduling may allow the network to provide PDSCH assignments and/or PUSCH grants in one cell for transmissions/receptions in other serving cell(s).

Radio Resource Control (RRC) may handle the control plane signaling and the exchange of layer 3 messages between an enhanced Node B (eNB) and the WTRU. For LTE R8/9/10+, an Evolved Universal Terrestrial Radio Access (E-UTRA) may define a number of RRC states (e.g., two RRC states): RRC_CONNECTED and RRC_IDLE. The WTRU may be in the RRC_CONNECTED state when an RRC Connection has been established. If an RRC Connection has not been established, the WTRU may be in the RRC_IDLE state.

In the RRC_IDLE state, the WTRU may monitor the paging channel to detect incoming calls, change of system information, and possibly also Early Terrestrial Warning System (ETWS)/Commercial Mobile Alert System (CMAS) notifications. The WTRU may also perform neighboring cell measurements and cell selection or reselection and system information acquisition.

In the RRC_CONNECTED state, the WTRU may transmit or receive on unicast channels and may monitor the paging channel and/or System Information Block (SIB) Type 1 to detect incoming calls, change of system information, and possibly also ETWS/CMAS notifications. The WTRU may also be configured with one or more secondary cells in addition to the primary cell.

Figure 2:
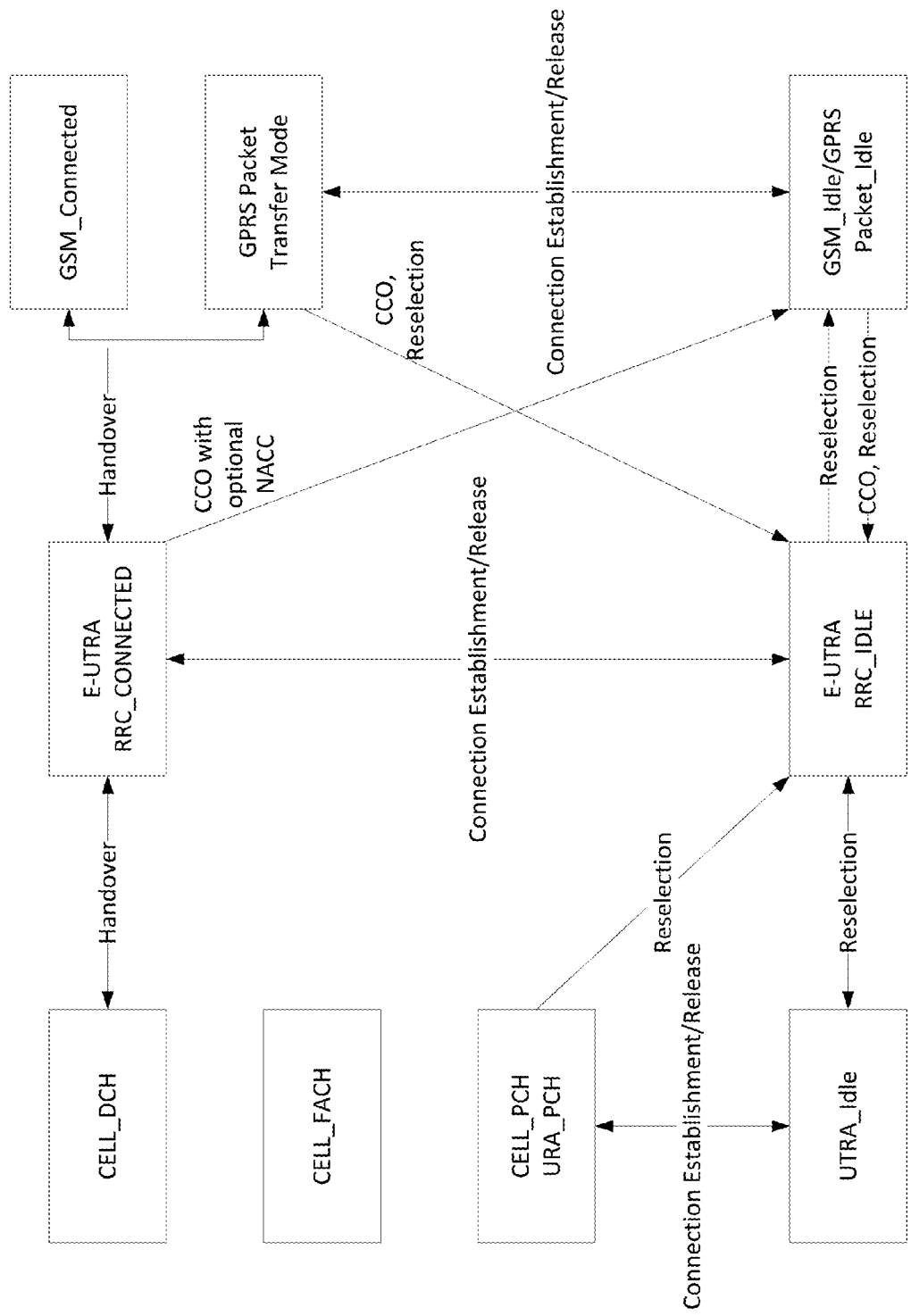
FIG. 2 is a block diagram illustrating an example of E-UTRA RRC states and mobility support between E-UTRAN, UTRAN, and GERAN.

In addition to the above states, a number of transition conditions, messages (e.g., Protocol Data Units (PDUs)), and procedures may be defined. FIG. 2 illustrates an example of E-UTRA RRC states, including a RRC_IDLE state 202 and a RRC_CONNECTED state 204, and mobility support between E-UTRAN, UTRAN, and GERAN.

A control channel, for example, a Physical Downlink Control Channel (PDCCH) may be used by the network (e.g., by an eNB) to assign resources for downlink transmissions on a PDSCH and to grant resources for uplink transmissions on a PUSCH to the WTRU.

The WTRU may request radio resources for an uplink transmission, for example, by transmitting a scheduling request (SR) to the eNB. The SR may be transmitted either on dedicated resources (D-SR) on a Physical Uplink Control Channel (PUCCH), if configured, or using the Random Access procedure, for example, Random Access Channel (RACH) or RA-SR.

The WTRU may be granted radio resources by the eNB for a transmission on PUSCH, indicated in a grant that may be received on the PDCCH in configured resources, for example, a Semi-Persistently Scheduled UL grant and/or a dynamically scheduled UL grant. In a given uplink transmission, a WTRU may include a Buffer Status Report (BSR) indicating the amount of data in a buffer of the WTRU. The trigger to transmit a BSR may trigger a scheduling request.

For Frequency Division Duplex (FDD), considering the processing delays in the WTRU (3 ms) and in the eNB (3 ms), and considering the transmission interval for each subframe in the uplink (1 ms) and for the downlink (1 ms), the Round-Trip Time (RTT) may be fixed, for example, at 8 ms. For Time Division Duplex (TDD), given the varying uplink and downlink subframe allocation, the RTT may be a function of said allocation.

The WTRU may determine whether or not it may act on control signaling in a given subframe by monitoring the PDCCH for specific data control information (DCI) messages (DCI formats) scrambled using a known radio network temporary identifier (RNTI) in specific locations, or search space, using different combinations of physical resources, for example, control channel elements (CCEs), based on aggregation levels, each corresponding, for example, to 1, 2, 4, or 8 CCEs used to transmit the DCI. A CCE may consist of 36 QPSK symbols, or 72 channel coded bits.

The PDCCH may be conceptually separated in two distinct regions. The set of CCE locations in which a WTRU may find DCIs it may act on may be referred to as a Search Space (SS). The SS may be conceptually split into the common SS (CSS) and WTRU-specific SS (WTRUSS). The CSS may be common to all WTRUs monitoring a given PDCCH, while the WTRUSS may differ from one WTRU to another. Both SS may overlap for a given WTRU in a given subframe, as this may be a function of the randomization function, and this overlap may differ from one subframe to another.

The set of CCE locations that make up the CSS, and its starting point, may be a function of the cell identity and the subframe number. For LTE R8/9, for example, DCIs may be transmitted with AL4 (4 CCEs) or AL8 (8 CCEs) in the CSS. For a subframe for which the WTRU monitors the PDCCH, the WTRU may attempt to decode two DCI format sizes, for example, formats 1A and 1C and format 3A used for power control, in up to four different sets of four CCEs for AL4 (e.g., 8 blind decoding) and up to two different sets of eight CCEs for AL8 (e.g., 4 blind decoding) for a total of twelve blind decoding attempts in the CSS.

The CSS may correspond to CCEs 0-15, implying four decoding candidates for AL4 (e.g., CCEs 0-3, 4-7, 8-11, and 12-15), and two decoding candidates for AL8 (e.g., CCEs 0-7 and 8-15).

The set of CCE locations that makes up the WTRUSS, and its starting point, may be a function of the WTRU identity and the subframe number. For LTE R8/9, DCIs may be transmitted with AL1, AL2, AL4, or AL8 in the WTRUSS. For a subframe, for which the WTRU monitors the PDCCH, the WTRU may attempt to decode two DCI formats in up to six different CCEs for AL1 (e.g., 12 blind decoding), up to six different sets of two CCEs for AL2 (e.g., 12 blind decoding), up to two different sets of eight CCEs for AL8 (e.g., 4 blind decoding), and up to two different sets of eight CCEs for AL8 (e.g., 8 blind decoding), for a total of 32 blind decoding attempts in the WTRUSS.

Depending on the connection of the WTRU to the network, capabilities, and supported features, the WTRU may monitor one or more RNTIs for grants, assignments, and other control information from the eNB. For example, a System Information RNTI (SI-RNTI) may be cell-specific, and may be used to indicate scheduling of system information on PDSCH, for example in the CSS. A Paging RNTI (P-RNTI) may be assigned to multiple WTRUs for decoding of the paging notification, for example, in RRC_IDLE mode, in the CSS.

A Random Access RNTI (RA-RNTI) may be used to indicate scheduling of the Random Access Response (RAR) on PDCCH, and may unambiguously identify which time-frequency resource was used by a WTRU to transmit the random access preamble. The WTRU may find corresponding DCI on PDCCH using the RA-RNTI, and may then receive the RAR on PDSCH. The RA-RNTI may be associated with/correspond to a Physical Random Access Channel (PRACH) of the PCell in which the Random Access Preamble was transmitted, and may be determined as:

$$\text{RA-RNTI} = 1 + t\_id + 10 * f\_id \tag{1}$$

where t_id may be the index of the first subframe of the specified PRACH ($0 \leq t\_id < 10$), and f_id may be the index of the specified PRACH within that subframe, in ascending order of frequency domain (e.g., $0 \leq f\_id < 6$). Thus, theoretically for a subframe there may be 10 transmission opportunities for a given PRACH in the time domain and 6 transmission opportunities in the frequency domain for the given PRACH, so there may be a total of 60 different PRACH transmission opportunities in the time-frequency grid for a given PRACH (e.g., per SFN). However, in most practical deployments the actual number of opportunities in a given subframe may be lower due to the actual PRACH configuration, collisions with other signaling, and other transmission issues.

A Multimedia Broadcast and Multicast Services (MBMS) RNTI (M-RNTI) may be cell-specific and may be used to decode the notification of a change on the MBMS control channel (MCCH) in the CSS. A Cell RNTI (C-RNTI) may be a WTRU-specific RNTI and may be used to decode PDCCH for contention-free grants and assignments, for example, for DCIs in the WTRUSS. A Temporary C-RNTI may be used to decode the MSG4 message for the contention-based procedure, and/or before the WTRU gets assigned its own C-RNTI.

A Semi-Persistent Scheduling C-RNTI (SPS-C-RNTI) may be used to activate a semi-persistent downlink allocation on PDSCH or uplink grant on the PUSCH, in the WTRUSS. There may also be other RNTIs, including, for example, transmit power control (TPC)-PUSCH-RNTI and TPC-PUCCH-RNTI, which may be used for power control of the PUSCH and PUCCH, respectively.

For LTE R8/9/10+, multiple control information messages, for example, DCIs, may be received by a given WTRU on PDCCH in each subframe. For example, multiple DCIs may be received for a WTRU configured with a single serving cell. There may be one UL grant and one DL assignment with C-RNTI/SPS-C-RNTI. The UL grant and/or the DL assignment may be absent. There may be one message with P-RNTI (paging) and one message with SI-RNTI (SI change notification) in the CSS. The message with P-RNTI and/or the message with SI-RNTI in the CSS may also be absent.

The WTRU may initiate the RA procedure when any of a number of events occurs. For example, the WTRU may initiate the RA procedure when the WTRU attempts to obtain initial access to the network to establish an RRC connection. As another example, the WTRU may initiate the RA procedure when the WTRU accesses the target cell during a handover procedure. As another example, the WTRU may initiate the RA procedure when the WTRU is perform an RRC Connection Re-establishment procedure. As another example, the WTRU may initiate the RA procedure when the WTRU is be instructed by the network to perform the RA procedure, for example, by a PDCCH RA order (e.g., for DL data arrival). The WTRU may initiate the RA procedure when the WTRU determines that it has data to transmit. For example, the WTRU may determine to send a scheduling request, but may lack dedicated resources on PUCCH for sending the request. For example, the WTRU may have new UL data to transmit that may be of a higher priority than existing data in its buffer (e.g., and/or was previously indicated in a previous BSR) and may send a SR to the network via the RACH. When a WTRU already has data in its buffer, a scheduling request may be triggered if new data that arrives is of a higher priority than existing data. If there is no data in the WTRU's buffer, any data that arrives in the buffer may trigger the SR. A SR may be triggered by a BSR. A SR may indicate that the WTRU needs resources, while a BSR may indicate how much the WTRU has in its buffer.

Figure 3:
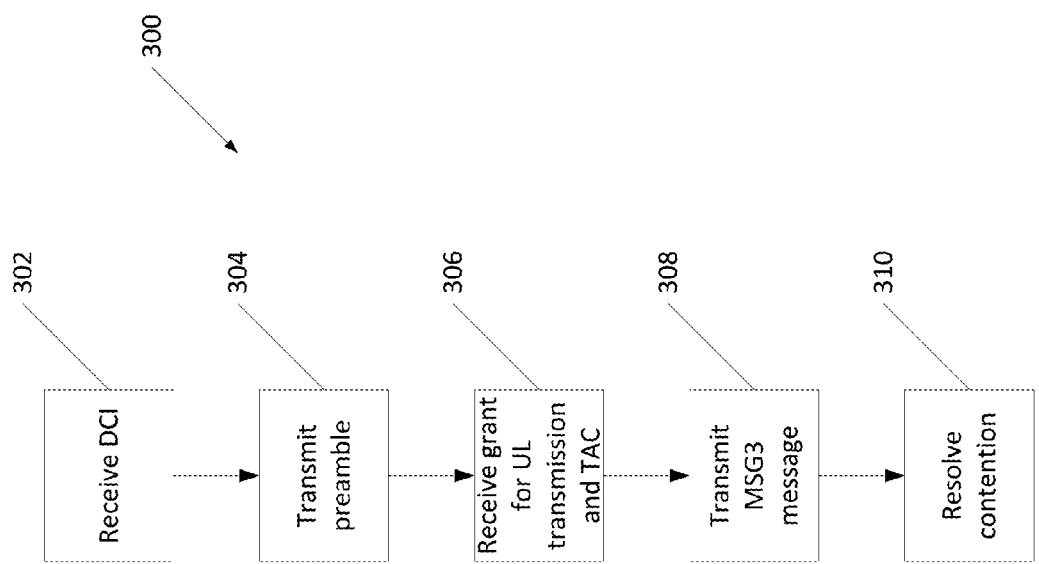
FIG. 3 illustrates an example random access procedure that may be performed.

Depending on whether or not the WTRU is assigned dedicated RACH resources, for example, a specific preamble and/or PRACH resources, the RA procedure may either be contention-free (CFRA) or contention-based (CBRA). FIG. 3 illustrates an example RA procedure 300 (e.g., a RACH procedure) that may be performed. A MSG0 message may be applicable to network-initiated RACH procedures. A MSG0 message may be received by the WTRU at 302 and may include DCI received on the PDCCH indicating that a RACH should be performed. The RACH procedure may include a MSG1 message. At 304, a preamble transmission (MSG1) on a resource of the Physical Random Access Channel (PRACH) may be transmitted. The RACH procedure may include a MSG2 message, which may include a Random Access Response (RAR) message. At 306, a MSG2 message may be received from an eNB and may contain a grant for an uplink transmission and a Timing Advance Command (TAC).

Additionally, for CBRA, at 308, a MSG3 message may be transmitted from the WTRU, for example to facilitate contention resolution. The MSG3 message may contain a BSR, signaling data, and/or user plane data. The RACH procedure may include a MSG4 message that may be applicable to CBRA. The MSG4 message may be applicable to contention resolution. Contention resolution may be performed at 310. For example, the WTRU may determine whether or not it successfully completed the RACH procedure based on either C-RNTI on PDCCH or WTRU Contention Resolution Identity on DL-SCH. The MSG4 message may be received by the WTRU.

In 3GPP LTE R8, R9, R10, and Release 11 (R11), there may be a single PRACH configured for a given cell. For example, there may be a single set of PRACH resources in a cell. For FDD (frame structure 1), a WTRU may be configured by a higher layer configuration, for example from reception of broadcast System Information or from reception of dedicated signaling, possibly with at most one PRACH resource for any given subframe that is configured with available PRACH resources.

For TDD (frame structure 2), due to the nature of the UL/DL subframe configuration, frequency multiplexing may additionally be used when time multiplexing may not be sufficient to obtain the desired PRACH density. In an example, the WTRU may be configured by a higher layer configuration, for example, from reception of broadcast System Information or from reception of dedicated signaling, with one or more PRACH resources for each subframe configured with available PRACH resources. Each PRACH may be associated with an offset (prach-FrequencyOffset) that may indicate the first Physical Resource Block (PRB) of the PRACH in that subframe, for example, the first PRB of the six PRBs used for the preamble. Each PRACH may be indexed (f_id) based on increasing frequency domain indices. When frequency multiplexing may be used, there may be multiples of six PRBs for PRACH availability in the given subframe. Each set of six PRBs may represent a single PRACH opportunity.

When the WTRU may perform the random access procedure, the WTRU may transmit a preamble on an uplink resource of a configured PRACH, if a PRACH resource is available in the given subframe. Each random access preamble may occupy a bandwidth corresponding to six consecutive resource blocks, for example, for both the FDD and the TDD frame structures. A WTRU may be configured with multiple groups of preambles (e.g., group A, group B, etc.) for the random access procedure on a given serving cell. The selection of the preamble group may be a function of the size of the MSG3 message. For example, selection of the preamble group may be based on whether the data to transmit is larger than a threshold size indicated for group A. In an example, selection of the preamble group may be a function of the radio conditions in the cell. For example, the selection of the preamble group may be based on the estimated DL pathloss to ensure that the DL pathloss does not exceed a given value.

Figure 4:
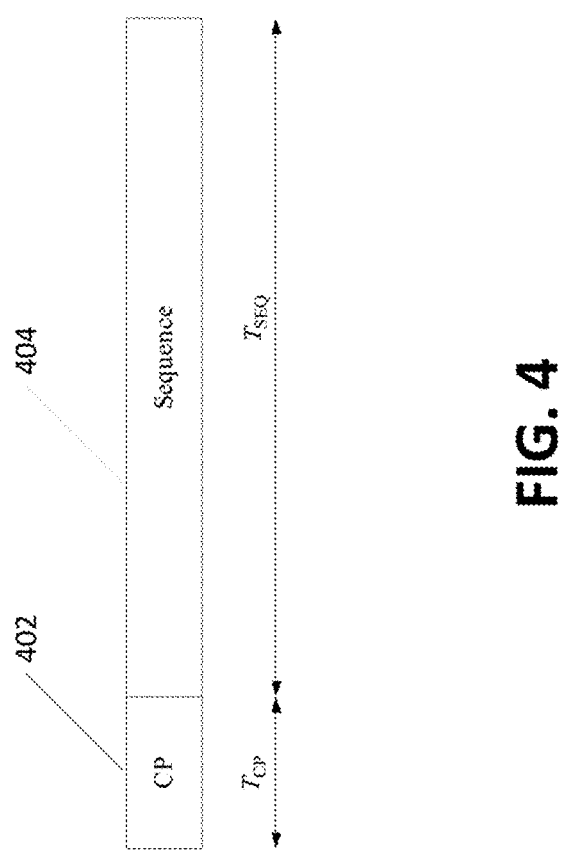
FIG. 4 illustrates example time periods that may be associated with a cyclic prefix and a data sequence for a random access preamble transmission.

According to an example, FIG. 4 illustrates example time periods that may be associated with a cyclic prefix 402 and a data sequence 404 for a random access preamble transmission. The physical layer random access preamble may include a cyclic prefix of length $T_{cp}$ and a sequence part of length $T_{seq}$ (e.g., 0.8 ms). $T_{cp}$ may be approximately 0.1 ms, 0.68 ms, and/or 0.2 ms, depending on the preamble format used. The respective lengths for $T_{cp}$ and/or $T_{seq}$ may depend on the frame structure (e.g., FDD(1) or TDD(2)) and/or the random access configuration. For example, the respective lengths for $T_{cp}$ and/or $T_{seq}$ may depend on whether a FDD(1) or a TDD(2) frame structure is used. Preamble formats (e.g., formats 0, 1, 2, 3, and/or 4) may be defined. The length of each of the preamble formats for $T_{cp}$ and $T_{seq}$ may depend on the preamble format used. For example, preamble format 4 may be applicable to frame structure 2 (TDD).

For preamble format 2 (e.g., 2 ms) and 3 (e.g., 3 ms), the sequence, which may have a length of 0.8 ms, may be repeated twice. There may be a maximum of 64 different preambles in a given cell, which may correspond to six bits transmitted as the Sequence $T_{seq}$ in the preamble format of FIG. 4. The WTRU may determine whether or not preamble group B is available based on the parameters numberOfRA-Preambles and sizeOfRA-PreamblesGroupA. If these parameters differ, then there may be two preamble groups (e.g., A and B). For example, in LTE R10, the PRACH-Config IE may specify the PRACH configuration. For example, the PRACH configuration IE may include a information element 500 as shown, for example, in FIG. 5.

Figure 6:
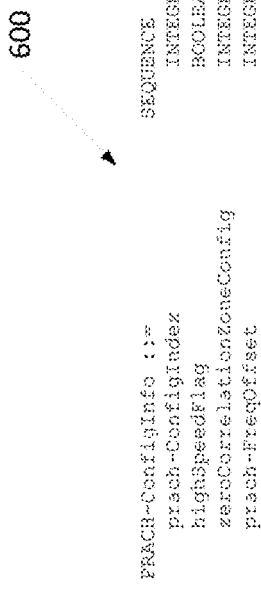
FIG. 6 illustrates an example PRACH configuration IE.

The WTRU may use the parameter rootSequenceIndex to determine the 64 preamble sequences for a given cell. The PRACH-ConfInfo IE may be included in the PRACH-Config IE and may indicate the root sequence. For example, the PRACH-ConfigInfo IE may include a information element 600 as shown, for example, in FIG. 6. The parameter prach-ConfigIndex may indicate which of the 64 possible configurations for the specific frame structure (e.g., FDD or TDD) may be used to determine the set of PRACH resources available in the cell. The WTRU may use this information to determine the PRACH Resource Indexing for the cell. The parameter prach-FreqOffset may indicate the first PRB of the PRACH in a given subframe. For example, the parameter prach-FreqOffset may indicate the first PRB of the six PRBs used for preamble transmission. For frame structure 2

(TDD) and preamble format 4, frequency multiplexing may be performed according to a function of the number of DL to UL switching point.

The transmission of a random access preamble may be limited to certain time and frequency resources. These resources may be enumerated in increasing order of the subframe number (e.g., subframe number 0, 1, 2, . . . , 9) within a radio frame (e.g., 10 ms) and the PRBs in the frequency domain, such that PRACH Resource index 0 may correspond to the lowest numbered PRB and subframe within that radio frame. When the WTRU may be assigned a dedicated resource, the WTRU may perform the transmission of the preamble on the PRACH resource that may correspond to the indicated ra-PRACH-MaskIndex (e.g., index 0, 1, 2, . . . , 15) according to a mapping between the indicated value and the allowed PRACH resource(s) for that value. For example, a "0" may correspond to all resources, a 1 may correspond to index 0, 11 may correspond to the first resource in an even PRACH opportunity in the time domain, etc.

For LTE R10, a WTRU may have a single set of PRACH resources (given by prach-ConfigIndex), where each resource may be indexed using a PRACH Resource Index (e.g., referenced using ra-PRACH-MaskIndex) for a given 10 ms radio frame. The PRACH resource with the lowest index in a given subframe with PRACH may be indicated by prach-FreqOffset.

For FDD (frame structure 1), there may be one resource per subframe and the indexing range may be from 0 to 9, inclusive. For TDD (e.g., frame structure 2), frequency multiplexing may be possible, where the number of PRACH resources per subframe with PRACH may be a function of the prach-FreqOffset, the density value, the frequency resource index (Fra) for the given density, the system frame number (e.g., for preamble/format 4), and/or the number of DL to UL switch points within the radio frame.

The WTRU may be configured, using RRC, with dedicated resources for the transmission of a channel quality indication (CQI), precoding matrix indicator (PMI), and/or rank indication (RI) reports and/or for scheduling requests (D-SR). In addition, a WTRU may be configured with dedicated uplink resources for SPS. For example, the WTRU may be configured with a PUSCH resource for UL SPS, as well as with an uplink PUCCH resource for HARQ A/N for a corresponding DL SPS configuration. The network may also assign a WTRU with dedicated SRS resources to assist scheduling decisions in allocation of uplink resources for PUSCH transmissions.

For a WTRU configured with a single serving cell, PUCCH Type 2 resources such as used for CQI/PMI/RI reports, may be explicitly assigned to the WTRU by the network using RRC signaling. For example, PUCCH Type 2 resources may be contained in a distinct set of explicitly administered resources. In an example, for LTE R8/9/10+ DL SPS transmissions, four PUCCH indices for PUCCH Type 1 HARQ A/N may be explicitly signaled to the WTRU using RRC signaling.

The WTRU may additionally be configured with a semi-static resource allocation on PUCCH for transmission of PUCCH format 3, and/or with a plurality of resources for transmission of PUCCH format 1b with channel selection.

A discrete Fourier transform spread (DFTS)-OFDM based LTE uplink transmission may allow for uplink intra-cell orthogonality, which may imply that uplink transmissions received by the eNB from different mobile terminals may not interfere with each other. To maintain this orthogonality, transmissions from different mobile terminals within the same subframe but within different frequency resources may arrive at the eNB approximately time-aligned, where the margin of error may be within the cyclic prefix length. The cyclic prefix may be a guard interval in the time domain that may be added to each symbol to handle channel delay spreading. For LTE, the generic frame structure with normal cyclic prefix length may contain seven symbols, and the cyclic prefix length may be 5.2 µs for the first symbol and 4.7 µs for other symbols of the frame. For larger cells, an extended prefix may also be configured.

The timing advance may be a negative offset, at the WTRU, between the start of a received downlink subframe and a transmitted uplink subframe. For example, the subframe for the uplink transmission may start ahead of the downlink subframe at the WTRU. The offset may be adjusted by the network using, for example, TA Command (TAC) signaling. For example, adjustments may be based on previous uplink transmissions by the WTRU, including Sounding Reference Signals (SRS) and/or any other uplink transmissions.

Before a WTRU may perform uplink transmissions for periodic SRS or an uplink transmission on PUCCH (e.g., HARQ A/N feedback, SR, periodic CQI/PMI/RI reports) or PUSCH, the WTRU may determine a proper timing alignment with the network. Uplink synchronization may be initially achieved using the RACH procedure, and the network may subsequently transmit TA Commands (TAC) in the downlink to maintain proper timing alignment. When the WTRU may receive the TAC, the WTRU may restart the Time Alignment Timer (TAT). In an example, the TAT may have values of sf500, sf750, sf1920, sf2560, sf5120, sf10240, and/or infinity. A TAC may be received in the RAR during the RA procedure or in a Timing Advance MAC Control Element.

When the TAT is running, the WTRU may transmit on a PUCCH resource in a subframe for which the WTRU may not perform a PUSCH transmission (e.g., single carrier property). PUCCH resources may be dynamically allocated for HARQ A/N feedback for a PDSCH transmission in a frequency/time shared resource of the PUCCH region. The WTRU may determine which PUCCH resource to use based on, for example, the first CCE of the DCI received on PDCCH that indicated the PDSCH assignment.

The TAT may expire for a synchronized WTRU, for example, when the WTRU may not receive a TA Command (TAC) from the network for at least a period equal to the configured value of the TAT. For example, the TAT may range from 500 ms to 10240 ms, if enabled. A WTRU may not receive a TAC if each of the transmitted TACs may be lost during that period, for example, following the consecutive loss of multiple TACs. This may be a rare error case that may be reduced or minimized by a scheduler implementation that may use sufficient repetitions. In an example, a WTRU may not receive a TAC if the network does not transmit one (e.g., for the purpose of implicitly releasing dedicated uplink resources when the network may no longer schedule the WTRU for new transmissions). Accordingly, the validity of the timing advance for the WTRU may be implicitly determined by the WTRU based on control signaling sent or not sent by the eNB.

When the TAT expires, the WTRU may release dedicated uplink resources. For example, any configured SRS resources and/or PUCCH resources for D-SR, CQI/PMI/RI or any configured downlink and uplink SPS resources may be released. For example, when the TAT expires, the WTRU may release any configured downlink and uplink SPS resources.

Additionally, the WTRU may determine not to perform any PUCCH or PUSCH transmissions once it may not be considered synchronized with the network. One motivation to avoid uplink transmission from WTRUs that may no longer be synchronized may be to avoid possible interference to the transmission of other WTRUs. In addition, stopping uplink transmission upon lack of synchronization may provide implicit means for the WTRU to determine that the scheduler may have revoked dedicated uplink resources, for example, by making such a determination upon the TAT expiring following the absence of TACs from the network.

Signaling Radio Bearers (SRBs) may be radio bearers that may be used for the transmission of RRC and NAS messages. For example, SRB0 may be used for RRC messages using the Common Control Channel (CCCH) logical channel. SRB1 may be used for RRC messages, possibly with a piggybacked NAS message, and/or for NAS messages prior to establishment of SRB2 using the Dedicated Control Channel (DCCH) logical channel. SRB2 may be used for NAS messages and may be configured after activation of security. Once security may be activated, RRC messages on SRB1 and SRB2 may be integrity protected and ciphered. Data Radio Bearers (DRBs) may be radio bearers that are used for the transmission of user plane data (e.g., Internet Protocol (IP) packets).

A service that may generate user plane data may be associated with a Radio Access Bearer (RAB). A WTRU may be configured with one or more RABs, and different RABs may terminate in a different packet data network (PDN) gateway PGW in the core network (CN). A RAB may be associated with a DRB. A RAB may be associated with a specific set of Quality of Service (QoS) characteristics. The network may configure a DRB according to a desired level of QoS. For example, the network may configure a DRB with parameters such as logical channel (LCH) priority, Prioritized Bit Rate (PBR), and/or PDCP SDU discard timer, according to the desired level of QoS.

A DRB may be associated with a default EPS bearer and/or to a dedicated bearer. Applications may use bearers (e.g., default and/or dedicated) according to the given QoS supported by those bearers. Packet filters may be used in the WTRU, for example, for uplink data, and in the CN, for example, for downlink data, to determine how to associate an IP packet with a given bearer.

A service may generate user plane data that may involve different QoS levels. For example, a Voice over IP (VoIP) application may generate a real-time transport protocol (RTP) voice/audio stream using a given UDP port and exchange RTP control (RTCP) protocol packets using a different UDP port. In this example, the RTP flow may use a first RAB, while the RTCP flow may use a second RAB. The WTRU may be configured to determine, for each generated IP packet, which RAB the packet should be transmitted on. For example, the WTRU may use packet filters and/or Traffic Flow Templates (TFTs) to make the determination. The WTRU may be configured with packet filters or TFTs by the network.

One or more EPS bearer(s) may be setup or removed for a WTRU given using higher layer procedures. The WTRU may maintain any default EPS bearer(s) and any other associated dedicated bearer(s) in the context of the WTRU as long as the WTRU may be attached to the network. For example, EPS bearers may be maintained in the context of the WTRU independently of the state of the RRC connection, for example, even when in idle mode. EPS bearers may be removed when the WTRU performs the detach procedure from UTRA. EPS bearers may be removed when the WTRU performs a detach procedure from E-UTRA/UTRA. When the WTRU releases an RRC connection, any radio access bearers (e.g., SRBs and/or DRBs) may also be released. For example, the S1u connection and associated context between the eNB and SGW may be released.

WTRUs and other wireless devices may support a wide variety of applications, often in parallel. One or more of the applications may have different traffic characteristics and requirements. Many such applications may be agnostic to the technology used for the transmission of their data, and/or may be ill-suited for wireless transmissions. For example, in case an application may generate small amounts of data traffic with relatively long periods of low volume at intermittent intervals, a WTRU may be idle for long periods while it may still regularly have to connect to the network to exchange small amounts of data.

A WTRU may be configured in a variety of manners. Tradeoffs may be achieved between data transfer latency, power consumption, control signaling overhead, and/or network efficiency. For example, a WTRU may be in the RRC_CONNECTED state for a very long period of time for the benefit of low control signaling overhead and low data transfer latency. However, remaining in this state for a long time may be at the expense of battery usage and/or network resource efficiency when dedicated resources may remain committed but not fully utilized. In an example, a WTRU may periodically transition between the RRC_CONNECTED and RRC_IDLE states for the benefit of low power consumption. However, such a scheme may result in increased data transfer latency and/or additional control signaling overhead.

In an example where one or more applications may remain constantly active (and/or semi-constantly active), and may generate background traffic at regular and/or irregular intervals, the aggregated sum from a plurality of WTRUs operating in such a manner may lead to increased commitment of PUCCH resources for dedicated scheduling requests (D-SR). Such resources may remain underutilized and may lead to increased signaling in order for the WTRU to be kept with proper uplink timing alignment. Moreover, utilizing the RA-SR often to request resources may cause network-related impairments, such as increased load on the PRACH, where random access procedures initiated by different WTRUs and/or for different purposes may compete with each other, thereby increasing the probability of preamble collisions, delays, and/or unsuccessful completion. For example, RA-SR triggered for transmission of lower priority background traffic may contend with RACH for other purposes that may be of a higher priority (e.g., connection establishment procedures for initial access or recovery procedures, connections for emergency access).

The methods described herein may address how to indicate priority information while accessing the network and/or requesting uplink resources; how to receive an indication of, and/or how to determine whether there is congestion in the radio network; and/or how to respond to congestion in the radio network. The methods disclosed herein may also include: methods to configure additional PRACH resources; methods to determine a second set of PRACH resources within configured resource sets; methods to determine the set of PRACH resources to be used for preamble transmission in case of overlap between a first and a second set of configured PRACH resources; methods to determine a second set of PRACH preambles; methods to extend preamble format for a given set of PRACH resources; methods to handle sets of PRACH resources of different physical resource length; methods to handle RACH failure on a second set of PRACH resources; and/or the like.

Also disclosed herein are systems and methods based on RA-SR that may avoid the inefficient allocation of PUCCH resources, as well as to avoid the periodic generation of uplink transmissions to maintain synchronization for a WTRU, for example when the WTRU may be in some form of "dormant" state with background data to transmit intermittently. Such systems and methods may minimize the impact of RA-SR procedure and corresponding preamble (re)transmission(s) to the RACH procedure of other WTRUs in the same cell. For example prioritization on RACH may be utilized to ensure that certain procedures that may be considered of higher priority (e.g., for RA-SR for higher priority data, for connection establishment, for mobility, for emergency calls, and/or for recovery purposes) are not unduly delayed or prevented. Such savings may be achieved by methods that minimize the risk of preamble collisions in the shared PRACH resources in a given cell.

When referred to herein, the term Multiple PRACH UE (MPUE) and/or the term multiple PRACH WTRU (MP-WTRU) may refer to WTRUs that may support and/or operate according to a configuration with a plurality of PRACH resource sets/configurations and related methods.

When referred to herein, the term Single PRACH UE (SPUE) and/or the term Single PRACH WTRU (SPWTRU) may refer to legacy WTRUs that lack support for the methods described with respect to a configuration with a plurality of PRACH resource sets/configurations. The terms SPUE and/or SPWTRU may also refer to MPUEs/MP-WTRUs that may support such methods but are not currently operating according to the use of multiple PRACH resources.

When referred to herein, the term PRACH resource may refer to the first PRB (e.g., frequency) of a set of consecutive PRBs that may be used for the transmission of a preamble and/or to the set of consecutive PRBs that may be used for the transmission of a preamble (e.g., typically 6 PRBs).

When referred to herein, the term PRACH opportunity may refer to a PRACH resource in a given subframe (e.g., in time).

When referred to herein, the term PRACH occasion may refer to a subframe (e.g., in time) in which there may be one or more available PRACH opportunities.

When referred to herein, the term first set of PRACH resources may be associated with a PRACH configuration that may be cell-specific. For example, the first set of PRACH resources may refer to a set of PRACH resources associated with a configuration received on the broadcast channel in the system information. The first set of PRACH resources may generally refer to PRACH resources that may be used by SPUEs. The first set of PRACH resources may generally refer to a default configuration for performing random access in a given cell.

When referred to herein, the term second set of PRACH resources may be associated with a PRACH configuration that may be configured for WTRUs that implement one or more of the methods described herein for operating with an additional set of PRACH resources in addition to the first set of PRACH resources. The second set of PRACH resources may refer to PRACH resources that are implemented in addition to the PRACH resources that may be utilized by SPUEs.

In an example, a priority level may be associated with a configuration used to perform a transmission. For example, a WTRU may be configured to determine which of a plurality of configurations to use when performing an uplink transmission. The first configuration may be associated with a first priority level and a second configuration may be associated with a second priority level. For example, the priority level may be based on a characteristic and/or a priority of the data to be transmitted and/or based on a state of the WTRU (e.g., a dormant state as a substate of the RRC_CONNECTED state).

In an example, a priority level may be associated with data to be transmitted and/or an event generating the data. For example, a WTRU may associate a priority level with data that has become available for transmission, with an event that triggered the transmission of such data, to an event that generated such data, and/or with a trigger for a random access procedure.

For example, a WTRU may implement implementation-specific and/or proprietary methods such that user data generated by, for example, a best-effort non-critical background application may be associated with a lower priority level than data from other applications, such as those transmitting real-time interactive (e.g., voice), best-effort interactive (e.g., web browsing) data, emergency call data, and/or control plane signaling. As another example, such priority level may be determined from the event that generated the data to the transmitted. For example, control plane signaling may generally be considered as being of a higher priority level than user plane data. However, such control signaling may be generated and available for transmission as the result of user plane data of lower priority being generated by an application and being available for transmission. In such a case, the control signaling may be considered to be of a priority that is equivalent to that of the corresponding user plane data. For example, a NAS Connection Establishment Request initiated for the purpose of establishing a best-effort default bearer for the transmission of data that is determined to correspond to best-effort, intermittent background traffic, or identified as such, may be associated with a lower priority level (e.g., the lowest priority level).

As another example, while not precluding other methods, a WTRU may implement methods such as those described in U.S. patent application Ser. No. 13/436,457, filed Mar. 30, 2012, which is incorporated by reference herein in its entirety. Such methods may include the implementation of a dormant behavior and/or state and/or implementation of a specific radio bearer, for example, an XRB, for the transfer of data from background applications. The methods described herein may be applicable for a WTRU that is in a RRC_CONNECTED state or in a RRC_IDLE state and/or a WTRU that uses a dormant behavior.

In an example, a priority may be associated with the random access procedure and/or to different aspects of a RACH procedure. For example, a priority may be associated with a PRACH configuration, a PRACH resource index, a preamble group, a preamble, and/or the like. While not limited to such association, such priority may correspond with the priority of the data and/or of the event that triggered the random access procedure.

Priority may be a function of one or more factors, for example in various combinations. For example, priority may be a function of a roaming state or a roaming agreement. A roaming WTRU may consider that it does not have to enforce priorities and may treat all of its bearers' requests with equal priority (e.g., high priority). Priority may be a function of the activation of a service or application. For example, a WTRU may support a service that is activated with a given priority (e.g., for a free service), the priority may be set to a low priority, while otherwise (e.g., for a paid service), the priority may be set to a high priority.

Priority may also be a function of whether the service was initiated by the WTRU or by the network. For example, if the application or service is initiated by the network, corresponding data and/or requests may be treated with a higher priority for the duration of the application or service.

As another example, priority may be a function of a prioritization mechanism (e.g., Access Class Barring, Service-Specific Access Control, Extended Class Barring, etc.). For example, if the WTRU determines that a prioritization mechanism is activated for the cell, it may enforce priorities according to the corresponding policies, while otherwise (e.g., if a prioritization mechanism is not activated for the cell) the WTRU may not enforce priorities.

Priority may also be a function of whether or not an application was already ongoing when the prioritization mechanism was activated. For example, while a prioritization mechanism is activated, the WTRU may determine that prioritization may be applied according to configured policies for applications or services that were not ongoing when the mechanism was activated. In an example, such applications or services may be associated with a low priority upon activation of a prioritization mechanism.

Priority may also be a function of WTRU capabilities, such as support for a specific feature and/or application class. For example, a WTRU may enforce policies if it has previously signaled that the feature is supported, while such signaling may be optional when the WTRU is in a roaming state. For example, one such feature may be Access Control for a specific device class, for a specific application, and/or for a specific service class. One such application, which may be prioritized, may include packet-based services, such as Disaster Message Board service and/or a Disaster Voice Messaging service.

As another example, priority may be a function of an RRC state (e.g., whether the WTRU is in an IDLE mode, a CONNECTED mode, or in a mode corresponding to a dormancy mode). For example, the WTRU may enforce policies related to prioritization while the WTRU is in a state that is different than RRC_IDLE mode.

Prioritization may be preconfigured or received as a configuration aspect by the WTRU with a list of prioritized applications, for example, according to operators' policies.

While the general principles, methods, and related examples disclosed herein may be described in the context of 3GPP LTE technology and related specifications, such systems and methods may be equally applicable to any wireless technology implementing methods for a dormant mode of operation and/or methods for battery savings in general, such as other 3GPP technology based on Wideband Code Division Multiple Access (WCDMA), High Speed Packet Access (HSPA), High-Speed Uplink Packet Access (HSUPA), and High-Speed Downlink Packet Access (HSDPA). In an example, the methods described herein may be used while the WTRU is operating according to a dormant behavior, but not when the WTRU is fully connected and/or in IDLE mode.

In an example, a WTRU may be configured to perform a WTRU-autonomous RACH procedure. The methods described herein, while not limited to, may be applicable to a random access procedure that may be triggered autonomously by the WTRU. For example, the WTRU may apply any of the methods described herein according to any of the following triggers for the RACH procedure: connection establishment, mobility event, recovery event, scheduling Request (RA-SR), and/or when data becomes available for transmission in the buffer(s) of the WTRU. In an example, the methods described herein may be applicable to a network-initiated RACH procedure and/or to a WTRU initiated RACH procedure, although the examples described herein may describe that the network initiated RACH procedures utilize the first set of PRACH resources.

The methods described herein may be used while the WTRU is operating according to a dormant behavior. The WTRU may receive the configuration described herein from dedicated signaling or from the broadcast system information, or by a combination of both.

The WTRU may indicate priority information when performing a preamble transmission (MSG1) during a random access procedure. The WTRU may perform preamble type selection, preamble selection, preamble group selection, PRACH selection, PRACH opportunity selection, PRACH length selection, dynamic scheduling of a PRACH occasion, and/or indication in the SR.

For preamble type selection (e.g., determining whether to use a random preamble or a dedicated preamble), the WTRU may select a preamble type as a function of the priority level associated with the procedure. For example, the WTRU may be configured with one or more dedicated preamble(s), where one or more, possibly each, may be associated with a given priority level. For example, the WTRU may be configured with a dedicated preamble that may be used for a procedure initiated with a first priority and/or for a first function. The WTRU may also be configured with another dedicated preamble that may be used for a procedure initiated with a second priority and/or a second function.

For preamble group selection (e.g., determining whether to use an existing preamble group or a new preamble group), the WTRU may select a preamble group as a function of the priority level associated with the procedure. For example, the WTRU may be configured with one or more group(s) of preambles. One or more preamble groups (e.g., each preamble group), may be associated with a given priority level. For example, the WTRU may be configured with a preamble group C that includes a number of preambles, dedicated or not. The WTRU may select a preamble from this preamble group C for a procedure initiated with a first priority level.

For PRACH selection, for example selection of a set of PRBs within a subframe to be used for preamble transmission (e.g., f_id, where 0≤f_id≤6), the WTRU may select a PRACH resource as a function of the priority level associated with the procedure. For example, the WTRU may be configured with one or more PRACHs, where at least one (e.g., each PRACH) may be associated with a given priority level. The WTRU may be configured with multiple PRACHs in the same subframe. For example, for a given subframe, the WTRU may be configured with a first PRACH that may be used for a procedure initiated with a first priority and with a second PRACH that may be used for a procedure initiated with a second priority. For example, a PRACH may refer to a specific set of PRACH resources, such a specific set of frequency resources that may be utilized for a PRACH transmission at a PRACH occasion.

For PRACH opportunity, for example, timing based on PRACH and a subframe within a frame (e.g., t_id) the WTRU may select a PRACH opportunity as a function of the priority level associated with the procedure. For example, the WTRU may be configured with one or more PRACH opportunities for a given PRACH, where one or more PRACH opportunities may be associated with a given priority level. For example, for a given PRACH, the WTRU may be configured with a first PRACH opportunity or a first set of PRACH opportunities that may be used for a procedure initiated with a first priority. The WTRU may also be configured with a second PRACH opportunity or a second set of PRACH opportunities that may be used for a procedure initiated with a second priority.

For PRACH length, for example, the number of PRBs used for the preamble transmission, the WTRU may select a preamble length as a function of the priority level associated with the procedure. For example, the WTRU may be configured such that a given PRACH may support transmission of a preamble on a different number of PRBs. The WTRU may then be configured such that a preamble transmission using a first set of PRBs (e.g., a first number of PRBs) may be associated with a first priority, while a preamble transmission using a second set of PRBs (e.g., a second number of PRBs) may be associated with a second priority. When the WTRU may initiate a random access procedure of a first priority, the WTRU may transmit the preamble on the selected first set of PRBs. When the WTRU may initiate a random access procedure of a second priority, the WTRU may transmit the preamble on the selected second set of PRBs.

The WTRU may be configured with a specific RNTI, for example, PRACH-RNTI, or PR-RNTI, for dynamic scheduling of PRACH resources. The WTRU may be configured with some or all of the above parameters with a PRACH configuration. The PRACH configuration may be associated with, for example, the PR-RNTI. The WTRU may receive the PR-RNTI and/or the PRACH configuration from the broadcast system information, or by dedicated signaling (e.g., RRC messages). The WTRU may use the PR-RNTI to decode one or more DCI in a given subframe. Such a subframe may be any subframe, for example, a continuous PR-RNTI decoding during a given interval, a subset of subframes within a frame, for example, indicated in a PRACH configuration such as using a bitmask, or recurring periodically, for example, for subframes that match SFN mod(X)=0, where X may be indicated in a PRACH configuration.

The DCI may include one or more of a carrier indicator, an index to a PRACH configuration, a resource block assignment, a frequency offset for PRACH, a preamble format, a SFN, and/or timing information. The carrier indicator may be, for example 0 or 3 bits. The resource block assignment may be the first PRB of the PRACH resource. The SFN may be coded information (e.g., Even, Odd, Any, etc.). The timing information may indicate in what subframe the corresponding preamble transmission should be performed (e.g., a value x). The DCI may also include padding bits.

In an example, the DCI may include an index to a PRACH configuration and padding bits. The WTRU may use the indicated PRACH configuration for the preamble transmission. In another example, the DCI may include a resource block assignment, timing information, and/or padding bits. The WTRU may determine what PRACH resource to use starting from the indicated PRB and subsequent PRBs (e.g., the following five PRBs when a PRACH resource may be six PRBs) available for the transmission of a preamble in subframe n+x, where n is the subframe of DCI reception. In another example, the DCI may consist of padding bits. The WTRU may use the configured PRACH information for the preamble transmission.

The PR-RNTI and/or the PRACH configuration may be available for RA-SR for certain types of traffic, such as high priority traffic, low priority traffic, and/or EDDA (e.g., enhancement for diverse data applications) traffic EDDA traffic may include intermittent transfers of small amounts of data, such as traffic generated by applications running in the background. The corresponding PRACH resources may be available when they are scheduled by the PR-RNTI. Successful decoding of the PR-RNTI may indicate that the corresponding PRACH resource may be available to the WTRU for PRACH transmission.

For example, the WTRU may start decoding the PDCCH for PR-RNTI when the WTRU determines that it may perform an SR. In particular, the WTRU may perform an SR where the SR may be triggered for data of a priority associated with the PRACH configuration, for example, from data associated with EDDA traffic. If the PR-RNTI may be common for WTRUs in a given serving cell, the WTRU may decode DCIs in the common search space of the PDCCH. The WTRU may have received the corresponding PRACH configuration on a broadcast channel, for example, for WTRUs in an IDLE mode. In an example, if the PR-RNTI may be dedicated to a given WTRU or to a group of WTRUs in a given serving cell, the WTRU may decode DCIs in the common search space and/or in the WTRU dedicated search space of the PDCCH. The WTRU may have received the corresponding PRACH configuration by dedicated signaling, for example, for WTRUs in a CONNECTED mode, or for WTRUs in an IDLE mode if the configuration may be persistent until a first mobility event. For example, a first mobility event may be a cell reselection or handover event.

If the WTRU successfully decodes a DCI on the PDCCH with the PR-RNTI, it may initiate the transmission of a preamble in the corresponding PRACH resource (e.g., the resource indicated in the DCI). The corresponding preamble transmission may be performed at subframe n+x, where n is a subframe of DCI reception and x is a processing delay. For example, the processing delay may be equal to six subframes. The DCI for PR-RNTI may include timing information, for example, the value of x, and/or frequency information for the PRACH resource, as described above.

In an example, preamble retransmission(s) may be performed on an explicitly scheduled PRACH resource, for example, using PR-RNTI as described above.

If used in combination with preamble group selection, the WTRU may perform the selection of a preamble according to a preamble grouping that may be specific to this procedure. For example, the WTRU may select a group of preambles as a function of the size of data and/or the DL pathloss, such that it may further help the network to determine the size of a grant for the first transmission following the successful RA-SR.

In an example, if the WTRU reaches a threshold number (e.g., a maximum number) of preamble transmissions using the resources indicated in the grant coded with the PR-RNTI, the WTRU may cancel the corresponding SR for congestion control. This threshold number may be configured by the network. The WTRU may initiate a normal scheduling request (e.g., a legacy RACH SR procedure), for example if this method is used to manage uplink resources. For example, the WTRU may initiate a normal SR by using PRACH resources according to known procedures, such as LTE R8 procedures.

For indication in the SR, the WTRU may indicate the priority of the data using a two-bit SR message, for example, similar to PUCCH format 1a or 1b. The indication may be in a PUCCH region separate from the single-bit SR region. The SR may convey a single-bit message indicating that the WTRU may have new data to transmit. The second bit in the SR message may indicate the priority of the data that the WTRU may have to transmit. For example, if the value of the second bit is 0, it may indicate that the WTRU may have low priority data to be transmitted. If the value of the second bit is 1, it may indicate that the WTRU may have high priority data to transmit in its buffer. It will be appreciated that a value of the second bit of 0 may indicate high priority, while a value of the second bit of 1 may indicate low priority. The network may handle the scheduling request based on the indication from the WTRU. When the WTRU may transmit a two-bit scheduling request, the network may implicitly assume that the SR is for EDDA-type data because the WTRU may not transmit a two-bit SR for non-EDDA data. In another example, if a two bit scheduling request is utilized, the network may assume the SR is for high priority data, for example if use of the two bit SR is reserved for high priority data.

For the examples above, a first priority level may be a higher priority level, (e.g., related to measurement reports, if configured, or for conversational services, and the like). A second priority level may be a lower priority level, for example, related to intermittent traffic from background applications. When the above methods are used such that a first priority may indicate a high priority level, the network may handle legacy access requests in the same manner, for example, with the same equal priority, while providing enhanced service to requests that use the indication of high priority. When the above methods are used such that a first priority may indicate a low priority level, the network may handle legacy requests in the same manner, for example, while WTRUs implementing such methods may provide opportunities for the network to handle low priority service requests on a best-effort basis.

For the examples above, the WTRU may use such methods for the random access procedure for a specific set of DRB while the WTRU is in a RRC_CONNECTED state, or for a specific type of RAB (e.g., conversational RAB in the case of high priority) for the NAS Service Request while the WTRU is in a RRC_IDLE state, or for a specific application (e.g., a voice service in the case of high priority).

If the WTRU determines that a Random Access procedure should be initiated based on a higher priority level while there may already be one random access procedure ongoing for a lower priority level, the WTRU may abort the ongoing procedure and initiate a new Random Access procedure with a different set of parameters, for example, according to the higher priority level.

The WTRU may determine that the serving cell on whose resources the WTRU may be performing a random access is in a congested state when performing a random access procedure. The WTRU may perform Unsuccessful RAR reception or Successful RAR reception in this scenario. Combinations of Unsuccessful RAR reception and Successful RAR reception may be used to indicate different levels of congestion and/or a specific backoff period.

If the WTRU does not successfully receive a RAR during a RACH procedure (e.g., after a threshold or maximum number of preamble retransmissions), the WTRU may determine a congestion state of a serving cell as a function of the preamble transmissions, for example, whether legacy or a method disclosed herein, and as a function of whether or not a RAR is received. The WTRU may monitor PDCCH for downlink control signaling scrambled with RA-RNTI according to the transmitted preamble for a RAR reception. The WTRU may not determine that it has successfully received a RAR for the corresponding preamble, and the WTRU may have performed the maximum number of preamble transmissions for this random procedure.

If the WTRU used a method different than the legacy R8 method for the transmission of the preamble for the random access procedure, for example according to one or more of the methods disclosed herein such as indicating a priority level, the WTRU may determine that the serving cell may be in a congested state. The WTRU may perform one or more actions disclosed herein for responding to congestion. For example, if the WTRU transmits a preamble in a manner that indicates a high priority level (e.g., using a specific preamble, using a specific PRACH occasion/opportunity, indicating priority in the SR, etc.), and the WTRU does not receive a RAR, the WTRU may determine that the network is in a congested state.

Furthermore, when the WTRU does not detect PR-RNTI for a given period of time, the WTRU may cancel the corresponding SR for congestion control. The WTRU may initiate a normal SR, for example if the SR is being used to manage uplink resources.

For Successful RAR reception, if the WTRU transmitted a preamble, for example, according to one or more of the methods disclosed herein, the WTRU may determine a congestion state of a serving cell based on the received RAR and/or the preamble transmission. For example, the RAR may implicitly (e.g., when interpreted in light of the preamble transmission method or some other network parameter) or explicitly indicate the congestion state. As an example, the WTRU may determine a congestion state based on the RNTI used to decode the RAR (e.g., RA-RNTI, PR-RNTI, etc.) the reception window of RAR, the temporary C-RNTI included in the RAR (e.g., the temporary C-RNTI may indicate congestion), the backoff indicator (BI) in the RAR, an indication in a padding region of a RAR, and/or the like.

In the examples disclosed herein, a general expression for calculation of a RA-RNTI' may be:

$$RA\text{-}RNTI'=1+t\_id+10*f\_id \qquad (2)$$

Additionally, an offset value may be added to the legacy RA-RNTI calculation, for example so that the network may indicate a priority level and/or respond to a specific type of preamble transmission. For example, the RA-RNTI' may be determined as:

$$RA\text{-}RNTI'=1+t\_id+10*f\_id+offset\_value \qquad (3)$$

The value of offset_value may be known and/or configured, or may be a function of the method used for the preamble transmission as described above. For example, the offset_value may correspond to/be associated with a given preamble value, a preamble index, a preamble type, a preamble group, a PRACH index, a PRACH opportunity, and/or the like.

For RA-RNTI of the RAR, once the WTRU has transmitted a preamble, the WTRU may decode PDCCH to determine scheduling information for a RAR using a plurality of RNTI values, where one or more values may indicate a congested state (e.g., RA-RNTI'). For example, for a given preamble transmission, the WTRU may determine a first RA-RNTI' such that if a RAR is successfully decoded with the first RA-RNTI' (e.g., an RNTI value associated with the transmitted preamble), the WTRU may determine that the cell is in a congested state.

The WTRU may determine a congestion state based on the reception window for a RAR. For example, once the WTRU has transmitted a preamble, the WTRU may decode the PDCCH to determine scheduling information for a RAR using a plurality of RAR windows that may be non-overlapping, where successful reception of a RAR in one or more windows may indicate a congested state. For example, for a given preamble transmission, the WTRU may decode RA-RNTI (e.g., and/or RA-RNTI') in a first window. If no RAR may be received in the first window, the WTRU may additionally decode RA-RNTI in a second window. If a RAR that may correspond to the preamble transmitted may be successfully received in the second window, the WTRU may determine that the cell is in a congested state.

For Temporary C-RNTI in RAR indicating congestion (e.g., using a specific codepoint) once the WTRU may have transmitted a preamble, the WTRU may decode the PDCCH to determine scheduling information for a RAR, where successful reception of a RAR with the Temporary C-RNTI field may be set to a specific codepoint. For example, for a preamble transmission according to a method described herein, if the WTRU successfully receives a RAR that may correspond to the preamble transmitted and the Temporary C-RNTI field is set to a configured or known codepoint (e.g., all zeroes) the WTRU may determine that the cell is in a congested state. As another example, if the WTRU successfully receives a RAR according to one of the methods described herein, for example, by decoding for RAR using a plurality of RA-RNTIs and/or using a plurality of reception windows, with the Temporary C-RNTI field set to a configured or known codepoint (e.g., all zeroes), the WTRU may determine that the cell is in a congested state.

For backoff indicator (BI) in the RAR, once the WTRU has transmitted a preamble, the WTRU may decode the PDCCH to determine scheduling information for a RAR, where successful reception of a RAR with the BI field set may indicate a congested state. For example, for a preamble transmission according to a method disclosed herein, if the WTRU successfully receives a RAR that may correspond to the preamble transmitted and the BI field is set, the WTRU may determine that the cell is in a congested state. As another example, if the WTRU successfully receives a RAR according to one of the methods disclosed herein, for example, by decoding for RAR using a plurality of RA-RNTI and/or using a plurality of reception windows and/or with Temporary C-RNTI set to a specific codepoint, with the BI field set in the RAR, the WTRU may determine that the cell is in a congested state.

For Indication in the padding region of a RAR, once the WTRU may have transmitted a preamble, the WTRU may decode the PDCCH to determine scheduling information for a RAR, where successful reception of a RAR with additional information in the padding region may indicate a congested state. For example, if the WTRU successfully receives a RAR that may correspond to the preamble transmitted and with additional information, for example, a new field, in the padding region, the WTRU may determine that the cell is in a congested state.

For reception of a Scheduling Request (SR) response, the PDCCH may contain a zero size uplink grant as a response to a low priority scheduling request transmitted by the WTRU. When the WTRU may receive this type of response as a result of transmitting SR for low priority data, the WTRU may implicitly assume that the network is congested and may not try to access the network for a certain period of time or may execute one or more methods disclosed herein.

For reception of an SR response, when the WTRU may transmit an SR request for low priority data, the WTRU may start monitoring the PDCCH in a number of subframes (e.g., every subframe). The WTRU may monitor for DCI types 0 scrambled with a specific subframe with its RNTI for the uplink grant and another specific RNTI, for example, EDDA-RNTI. If the WTRU can decode the grant with EDDA-RNTI, it may indicate to the WTRU that the network may be congested, and the WTRU may take actions as described herein. It may be possible that this EDDA-RNTI may be a group RNTI assigned to more than one WTRU. Any able that can decode any DCI from an eNB using this RNTI may discover that the network may be congested.

If the WTRU may determine that the serving cell on whose resources it is performing a random access procedure may be in a congested state, for example, according to any of the methods disclosed herein, the WTRU may perform one or more of the procedures disclosed herein.

For example, the WTRU may abort the NAS Service Request (NAS SR) if a NAS SR procedure is ongoing. The WTRU may abort an ongoing RRC procedure for a transition to a CONNECTED state, if the WTRU is not already in the CONNECTED state. The WTRU may abort an ongoing RRC connection establishment procedure, if the WTRU is not already in the CONNECTED state. The WTRU may cancel transmission of, and/or discard, data associated with the event that triggered the random access procedure (e.g., after a certain amount of time).

The WTRU may apply a backoff period before attempting another access, for example, after a configured amount of time. The WTRU may initiate a cell reselection procedure with a different offset (e.g., a lower acceptable threshold for cell reselection) such that a different cell (e.g., with less congestion but lower quality) may be selected as a result. The WTRU may perform additional measurements, for example, if no RAR was received, to determine whether or not the failure to receive a RAR was due to cell congestion or due to poor radio link quality.

The WTRU may initiate an alternative transmission method for the considered data (e.g., a connectionless approach) a contention-based PUSCH transmission, or the like. The WTRU may initiate the use of a dormant behavior (e.g., a transition to a dormant mode). The WTRU may determine that the serving cell may be congested and that the WTRU may not be experiencing uplink radio link failure.

The PR-RNTI may be revoked when the WTRU may reselect to a different cell. For example, the PR-RNTI may be revoked if the PR-RNTI may be valid in an idle mode and/or when the WTRU may move to the idle mode, if the PR-RNTI may be valid in a connected mode.

In an example, a WTRU may receive a configuration described herein via dedicated signaling or from the broadcasted system information, or by a combination of both. RACH parameters may be specific to a set of PRACH resources. In an example, a WTRU may be configured with one or more parameters for the random access procedure that are specific to a second set of PRACH resources. The WTRU may use these parameters for a preamble transmission using a resource of the concerned set.

For example, a WTRU may be configured with a value for one or more of the following parameters, which value may be specific to a specific set of PRACH resources. For example, a WTRU may be configured with a value for the maximum number of preamble transmission (e.g., preamble-TransMax) for a preamble transmission on a resource of a second set of PRACH resources. For example, the value for the second set may be configured such that it is smaller than that of a first set for the purpose of limiting the amount of retransmissions on the second set. In an example, a WTRU may be configured with a value for the size of the Random Access Response (RAR) window (e.g., Ra-ResponseWindowSize) for the reception of a RAR corresponding to a preamble transmission on a resource of a second set of PRACH resources. For example, the value for the second set may be configured such that it is larger than that of a first set for the purpose of allowing more flexibility in time for scheduling a RAR.

In an example, a WTRU may be configured with a value for the initial preamble power (e.g., preambleInitialReceivedTargetPower) for a preamble transmission on a resource of a second set of PRACH resources. For example, if the second set uses a different preamble format (e.g., one with a less robust encoding) than that of a first set, the WTRU may be configured with a value that is larger than that of the first set (e.g., the cell-specific set) for the purpose of improving the reception of the preamble at the receiver. The WTRU may use a value (or an offset derived therefrom) that corresponds to a previous transmission in this cell, if, for example, the estimated downlink path loss has not changed by more than a threshold value (e.g., in dB).

In an example, a WTRU may apply a power offset to the preamble transmission (e.g., DELTA_PREAMBLE), for example, if the second set uses a different preamble format than that of a first set. In an example, a WTRU may be configured with the set of preambles available for the concerned set of PRACH resources, for example, if they differ between the first and second set. For example, the set of preambles for a second set of resources may correspond to a subset of the preambles available for a first set. In an example, a WTRU may be configured with the power ramping step (e.g., powerRampingStep) for a set of PRACH resources. For example, the WTRU may apply a different power ramping step when performing preamble retransmissions for a second set of PRACH resources than when performing preamble retransmission using a first set of PRACH resources.

In an example, a WTRU may be configured with a dedicated preamble for a set of PRACH resources. For example, the WTRU may be configured with a dedicated preamble that the WTRU may use for a preamble transmission for a RACH procedure using a second set of PRACH resources. For example, when the resources of a second set are mutually exclusive in relation to any other set of PRACH resources configured for the WTRU, the WTRU may be configured with a RACH dedicated RACH preamble for the second set. For example, the preamble may be derived according to a method or methods described herein.

In an example, a WTRU may be configured with the backoff period to be used with a set of PRACH resources. For example, the WTRU may apply a longer backoff period for a RACH procedure using a second set of resources than when using a first set of PRACH resources. Such a scheme may, for example, be used to configure a WTRU such that the power settings for a preamble transmission using a second set of PRACH resources may be either more aggressive or more conservative than for a transmission on a first set of resources, for example, by setting different initial power setting and/or a different power ramping.

A WTRU may be configured to initiate a second Random Access procedure while a first random access procedure may already be ongoing. For example, in LTE, the WTRU implementation may determine whether or not to abort an ongoing RACH procedure when a second RACH procedure is triggered in the same serving cell (e.g., using a single set of PRACH resources). A WTRU configured with a plurality of sets of PRACH resources may implement a priority between an ongoing RACH procedure for a specific set of PRACH resources and a trigger to initiate a RACH procedure using a different set of PRACH resources. This priority may be based on the relative priority level of the concerned set of PRACH resources and/or the trigger by which the WTRU determined that it should perform a RACH procedure.

For example, the WTRU may abort an ongoing RACH procedure for which a preamble was transmitted on the PRACH resources of a second set (e.g., a set that may correspond to a RA-SR procedure for data of lower priority) based on the WTRU determining that a RACH procedure should be initiated using the PRACH resources of a first set (e.g., a set that may correspond to a RA-SR procedure for data of higher priority). After aborting the ongoing RACH procedure, the WTRU may initiate a RACH procedure using the resources of the first set as a new procedure, for example, by resetting the number of preamble transmissions, by selecting a preamble (e.g., a dedicated preamble) that corresponds to the first set of PRACH resources, and/or by using the corresponding set of parameters.

In an example, a WTRU may transmit the first preamble for the new RACH procedure using the power level of the last preamble transmission of the RACH procedure that was aborted. In an example, a WTRU may transmit the first preamble for the new RACH procedure using the power level of the last preamble transmission of the RACH procedure that was aborted for the last preamble transmission for which the corresponding RAR window had expired when the WTRU determined to abort the ongoing RACH procedure.

In an example, the WTRU may receive a configuration and may determine a number/identity of additional PRACH resources according one or more of the following methods. For example, a WTRU may determine a number/identity of PRACH resources such that the PRACH resources may be added and/or multiplexed in the time domain. For example, a WTRU may receive a configuration with a plurality of prach-ConfigIndex IEs. Each IE may correspond to a different set of PRACH resources and may include a time domain configuration the different set of PRACH resources. For example, a WTRU may determine a number/identity of PRACH resources such that the PRACH resources may be added and/or multiplexed in the frequency domain. For example, a WTRU may determine a number/identity of PRACH resources using configuration messages, and the WTRU may receive a configuration with a plurality of prach-FreqOffset IEs. Each IE may correspond to a different set of PRACH resources and may include a frequency domain configuration the different set of PRACH resources. Frequency multiplexing may limit the maximum data rate for the corresponding subframe because frequency multiplexing may make the maximum number of consecutive PUSCH PRBs smaller. However, a slower data rate may be less of a concern with a second set of PRACH resources with low-density and/or possibly spread in time.

In an example, PRACH resources may be added and/or multiplexed in both the time and the frequency domains. For example, using configuration messages the WTRU may receive a configuration with a plurality of prach-Config IEs and prach-FreqOffset IEs. The sets of IEs may correspond to different sets of PRACH resources and may include a time and/or frequency domain configuration the different sets of PRACH resources.

Time multiplexing, frequency multiplexing, and/or time and frequency multiplexing may be used to add and/or multiplex additional cell-specific PRACH resources (e.g., using signaling on the broadcast channel and/or other system information) and/or as WTRU-specific configurations (e.g., identical for a plurality of WTRUs in the same cell). Time multiplexing, frequency multiplexing, and/or time and frequency multiplexing may be used to extend an existing PRACH. For example, a WTRU may use the same set of preambles (e.g., the same value for rootSequenceIndex may be applicable to each of the sets PRACH resources) and/or the same preamble format (e.g., the same value for the preamble format as indicated by the prach-Configuration-Index may be applicable to each of the sets of PRACH resources) for the transmission of a preamble in the additional PRACH resources. Time multiplexing, frequency multiplexing, and/or time and frequency multiplexing may be used to configure one or more additional PRACH resources, for example for which a WTRU may use a different set of preambles and/or a different preamble format for the transmission of a preamble in the additional PRACH resources.

In an example, configuration messages may be utilized to assist a WTRU in determining additional PRACH resources based on a state of the WTRU (e.g., whether or not the WTRU is configured to use a dormant behavior) and/or based on whether or not the WTRU received the configuration using dedicated signaling. For example, if the configuration was received via dedicated signaling, a WTRU may use a different interpretation of the PRACH configuration, for example, using an alternative (and/or extended) mapping table corresponding to the prach-ConfigIndex value.

The WTRU may determine the one or more set(s) of PRACH resources based on one or more of a number of criteria. In an example, the WTRU may determine one or more set(s) of PRACH resources based on a PRACH configuration. For example, a second set of PRACH resources may correspond to at least part of the PRACH resources added and/or multiplexed for the second PRACH configuration. For example, the WTRU may determine that PRACH resources configured in addition to the PRACH resources available to a SPUE correspond to the resources of a second set of PRACH resources. Such a method may allow the network to emulate a plurality of PRACH configurations (e.g., to handle contention between MPUEs and SPUEs in a given cell).

In an example, the WTRU may determine one or more set(s) of PRACH resources based on a System Frame Number (SFN). For example, a second set of resources may be determined as a function of the SFN. For example, the WTRU may be configured with a periodicity X such that resources corresponding to a second set include one or more PRACH occasions within a frame for which SFN mod(X) =0. Example values for X may be configured to approximate the maximum latency for the low priority services for a WTRU operating with a dormant behavior. In an example, SFN periodicity may be used in combination with a PRACH Mask Index, as described herein. SFN periodicity may be applicable to the initial preamble transmission for a given RACH procedure. Other resources may be determined as a function of the PRACH occasion for the initial preamble transmission, as described herein. This method may be used by the network to implement time-division for PRACH such that contention between MPUEs and SPUEs in a given cell may be reduced or minimized.

In an example, the WTRU may determine one or more set(s) of PRACH resources based on Start of DRX On-Duration (e.g., drxStartOffset). For example, a second set of PRACH resources may be determined as a function of the start of the DRX On-Duration period, if configured. Example values for the DRX cycle length may be configured to approximate the maximum latency for the low priority services for a WTRU operating with a dormant behavior. If multiple DRX configuration and or DRX cycles may be supported by the MPUE, the MPUE may use the start of the DRX On-Duration period that may correspond to the active DRX configuration and the current DRX cycle to determine one or more resources of the second set of PRACH resources.

For example, the WTRU may be configured with DRX and may determine that resources corresponding to a second set may include any PRACH occasions corresponding to a subframe that is part of the DRX On-Duration period in a DRX cycle. In an example, if the WTRU fails to receive the RACH MSG2 message successfully and cannot perform a preamble retransmission within the concerned On-Duration period as it has either expired and/or there are no PRACH occasions left in said period, the WTRU may determine that the RACH procedure is unsuccessful.

For example, the WTRU may be configured with DRX and may determine that resources corresponding to a second set may include the first PRACH occasion starting from the first subframe for which the WTRU is in DRX Active Time at the beginning of the On-Duration period in a DRX cycle. Such a scheme may be used for the initial preamble transmission to limit the rate of initial preamble transmission. In an example, preamble retransmissions may use a resource determined according a different method, for example, as a function of the PRACH occasion used for the initial preamble transmission for a RACH procedure. In an example, preamble retransmission may use any PRACH resources. In an example, if the WTRU fails to receive the RACH MSG2 message successfully and cannot perform a preamble retransmission within the PRACH occasions associated with the concerned On-Duration period, the WTRU may determine that the RACH procedure is unsuccessful. This method may be used in combination with a PRACH Mask Index, as described herein. This method may be used to limit the rate of initial preamble transmission.

In an example, a WTRU may determine one or more set(s) of PRACH resources based on a Semi-static PRACH Mask Index. For example, a second set of PRACH resources may correspond to a configuration of a PRACH Mask Index (e.g., for an index with a nonzero value). For example, the WTRU may be configured with a semi-static PRACH Mask Index corresponding to a second set of PRACH resources.

In an example, the masking method may be extended such that it may apply to multiple frames, for example, in combination with SFN numbering. For example, a WTRU may receive PRACH mask information such as an index value (e.g., an index value such as index value 1 which may indicate PRACH Resource Index 0 in any 10 ms frame for a SPUE) for a second set of resources. The mask may be applicable in frames for which SFN mod X=0 (e.g., X ms periodicity). The MPUE may then use this resource for a PRACH transmissions corresponding to a second set of resources in a frame that meets the SFN timing criteria. In other frames, the WTRU may use the resource for a preamble transmission that may correspond to the first set of resources.

In an example, the masking method may be extended such that more values may be signaled for SPUEs. In an example, the masking method may use an alternative table of values for MPUEs than is used for SPUEs. The network may use alternate masking tables to implement time- and/or frequency-division for the PRACH resources of a cell such that contention between MPUEs and SPUEs may be reduced or minimized.

In an example, a WTRU may determine one or more set(s) of PRACH resources based on DRX On-Duration period. For example, a second set of resources may be determined as a function of the DRX On-Duration period. For example, a WTRU may be configured with DRX and may determine that resources corresponding to a second set of PRACH resources may include one or more PRACH occasions that correspond to a subframe that may be part of the On-Duration period of the DRX cycle. In an example, a WTRU may determine one or more set(s) of PRACH resources based on DRX On-Duration period in combination with a configured PRACH Mask Index. For example, the resources of the second set may be the PRACH occasions that correspond to the logical AND combination of the PRACH masking and the subframes that are part of the DRX On-Duration period. In an example, a WTRU may determine that the resources of the second set may be the PRACH occasions that correspond to the logical AND combination of the PRACH masking and the subframes that are part of the DRX On-Duration period for the initial preamble transmission, but not for subsequent transmissions. In this example, preamble retransmissions may use a resource determined according one of the other methods disclosed herein, for example as a function of the PRACH occasion used for the initial preamble transmission for a RACH procedure.

In an example, a WTRU may be configured with PRACH resources, and the PRACH resources may be common to any preamble transmission. The second set of resources may include a dedicated preamble. In an example, the WTRU may transmit the dedicated preamble in a PRACH opportunity that may correspond to a subframe for which the WTRU is in DRX Active Time (e.g., D-SR replacement) during the DRX On-Duration period (e.g., which is a function of the SFN and active cycle). The reception of PDCCH signaling may be considered as successful reception of the RACH MSG2 message. Failure to receive the RACH MSG2 message successfully before the end of the On-Duration period may trigger the WTRU to determine that the RACH procedure is unsuccessful. The network may implement such a method in order to implement time- and/or frequency-division for the PRACH resources of a cell such that contention between MPUEs and SPUEs may be reduced or minimized.

In an example, a WTRU may determine one or more set(s) of PRACH resources based on DRX Active Time. For example, a second set of PRACH resources may be determined as a function of the DRX Active Time. For example, the WTRU may be configured with DRX and may determine that resources corresponding to a second set include one or more PRACH occasions that may correspond to one or more subframes that are part of the DRX Active Time for the WTRU. In an example, original preamble transmission may utilize PRACH resources for transmission based on DRX active time, but preamble retransmissions may use some other method. In an example, preamble retransmissions may use a resource determined according to any of the methods described herein, for example as a function of the PRACH occasion used for the initial preamble transmission for a RACH procedure. In an example, preamble retransmission may use any PRACH resources. In an example, determining the PRACH transmission parameters may be based on DRX Active Time in combination with a configured PRACH Mask Index. In this case, the resources of the second set may be the PRACH occasions that correspond to the logical AND combination of the PRACH masking and the subframes that are part of the DRX Active Time.

For example, a WTRU may be configured with PRACH resources, and the configured PRACH resources may be common to any preamble transmission. The second set of resources may include a dedicated preamble. The WTRU may transmit the dedicated preamble in a PRACH opportunity that may correspond to a subframe for which the WTRU is in DRX Active Time (e.g., D-SR replacement), but may refrain from doing so in other subframes. In an example, the reception of PDCCH signaling may be considered as successful reception of the RACH MSG2 message. In an example, failure to receive the RACH MSG2 message successfully before the end of the DRX Active Time may trigger the WTRU to determine that the RACH procedure is unsuccessful. Such a method may allow the use of a period subsequent to the transmission of a burst by which a WTRU may request further resources, for example in case the burst did not correspond to a background application.

In an example, a WTRU may determine one or more set(s) of PRACH resources based on the PRACH occasion used for the initial preamble transmission for a RACH procedure. For example, a second set of PRACH resources may be determined as a function of the PRACH occasion of an initial preamble transmission for an ongoing RACH procedure. In an example, a WTRU may determine additional PRACH resources for a second set of resources (e.g., for retransmissions) according to one or more of the following. For example, starting from the initial preamble transmission, and up to the maximum number of preamble transmissions for the concerned RACH procedure, the WTRU may transmit a preamble in a PRACH resource such that the resources may correspond to any of the resources configured for the WTRU, the resources may correspond to any of the resources of a second set configured for the WTRU, and/or the resources may be indicated by a PRACH Mask Index. Such a scheme may be used to limit the rate of initial preamble transmission.

In an example, a WTRU may determine one or more set(s) of PRACH resources based on Configuration of density. For example, a second set of PRACH resources may be determined as a function of a density signaled for the second set of PRACH resources. For example, for FDD and TDD, the WTRU may determine that for a PRACH occasion with a plurality of PRACH opportunities, the opportunity with the lowest index in the subframe may correspond to a first set of resources while other PRACH opportunities in the subframe may correspond to a second set. Such a scheme may be used to minimize signaling overhead when configuring additional PRACH resources, and may allow the network to configure PRACH resources as a function of the desired density in a frame. Such a scheme may allow the WTRU to identify a second set of PRACH resources, for example, based on an identification of a second set corresponding to the additional densification.

A WTRU determining one or more set(s) of PRACH resources based on parameters or criteria may be used to increase resource utilization. For example, PRACH partitioning may allow the reuse of the PRBs associated with a second set of resources such that PUSCH transmission may also be scheduled in the corresponding PRBs, for example, as a function of the probability of collision with a preamble transmission. In an example, the probability of collision may be a function of the number of WTRUs in the cell that may use the second set of resources.

The network may coordinate the configured sets of allocated PRACH resources (e.g., the first set and/or the second set) such that each of the configured sets are mutually exclusive (e.g., there may be no overlap between the PRACH resources associated with the first set and the PRACH resources associated with the second set). However, in an example, there may be overlap between the PRACH resources associated with the first set and the PRACH resources associated with the second set.

If one or more PRACH resources are configured as part of a plurality of sets (e.g., the same PRACH resource may be indicated as available in a first and in a second set), the WTRU may use the corresponding PRACH resource when the WTRU determines that a preamble transmission should be performed in a PRACH resource. If one or more PRACH resources overlap between a plurality of PRACH resource sets, in an example, the WTRU may determine that the overlapping resource may be used for any of the concerned sets. For example, the PRACH resource may be used when a resource from any of the concerned sets is to be used. In an example, if the same preamble format is used for the transmission of a preamble in the PRACH resource that is part of both sets irrespective of which set is to be used, the WTRU may determine that the resource may be used for either of the sets.

In an example, if one or more PRACH resources overlap between a plurality of PRACH resource sets, the WTRU may determine the PRACH resource that overlaps may be used for the first set, but not for the second set. For example, the WTRU may determine that the overlapped PRACH resource should be considered part of the first set of PRACH resources, for example for use with data and/or events of higher priority. In an example, the WTRU may determine that the overlapped PRACH resource may not be used for both sets if different preamble formats are used for the transmission of a preamble for the concerned sets.

In an example, if one or more PRACH resources overlap between a plurality of PRACH resource sets, the WTRU may determine the PRACH resource that overlaps may be used for the second set, but not for the first set. For example, the WTRU may determine that the overlapped PRACH resource should be considered part of the second set of PRACH resources, for example for data and/or an event of lower priority. In an example, the WTRU may determine that the overlapped PRACH resource may not be used for both sets if different preamble formats are used for the transmission of a preamble for the concerned sets.

A WTRU may be configured to determine a second set of PRACH preambles, for example, for use with a second set of PRACH resources. For example, the WTRU may determine the set of preambles available for a second set of PRACH resources according to one or more methods disclosed herein.

In an example, a WTRU may be configured to determine a second set of PRACH preambles based on a root sequence (e.g., rootSequenceIndex) specific to a second set of PRACH resources. For example, the WTRU may be configured with a root sequence index for the second set that may be different from that of the first set. For example, the WTRU may derive a second set of preambles applicable to a second set of PRACH resources using a root sequence that may be specific to the concerned set of PRACH resources. In an example, the WTRU may determine to utilize the second set of preambles and/or the second root sequence for the second set of PRACH resources based on a determination that the PRBs that correspond to the second set of PRACH resources are mutually exclusive to the set of PRBs that corresponds to a first set of PRACH resources.

In an example, a WTRU may be configured to determine a second set of PRACH preambles based on a subset of preambles from a first set. For example, a WTRU may be configured to determine a second set of PRACH preambles based on a subset of the cell-specific configuration. In an example, the WTRU may determine that a subset of the preambles available for the serving cell and/or first set of PRACH resources may be used for a preamble transmission on a second set of PRACH resources. The WTRU may determine the identity of the subset of preambles according to one or more of a number of parameters.

In an example, a WTRU may be configured to determine the identity of the subset of preambles that may be used for the second set of PRACH resources based on the WTRU being configured with a dedicated preamble for the second set of PRACH resources. In an example, a WTRU may be configured to determine the identity of the subset of preambles that may be used for the second set of PRACH resources based on a configuration of the preamble group that may specify which random access procedures (and/or triggers) are applicable to certain preambles. For example, the WTRU may be configured such that a RA-SR procedure may use a second set of PRACH resources. The preambles applicable to the function or trigger may be determined based on a time-division of the preamble assignments in a serving cell. For example, SPUEs may be configured according to existing methods. For example, MPUEs may be configured with a random access configuration that includes the parameters that may be indicative of preamble grouping. For example, the configuration may identify which preambles are applicable to a second set of PRACH resources. Such a scheme may be used when such resources may be mutually exclusive in time with resources available to SPUEs in the same cell.

Figure 7:
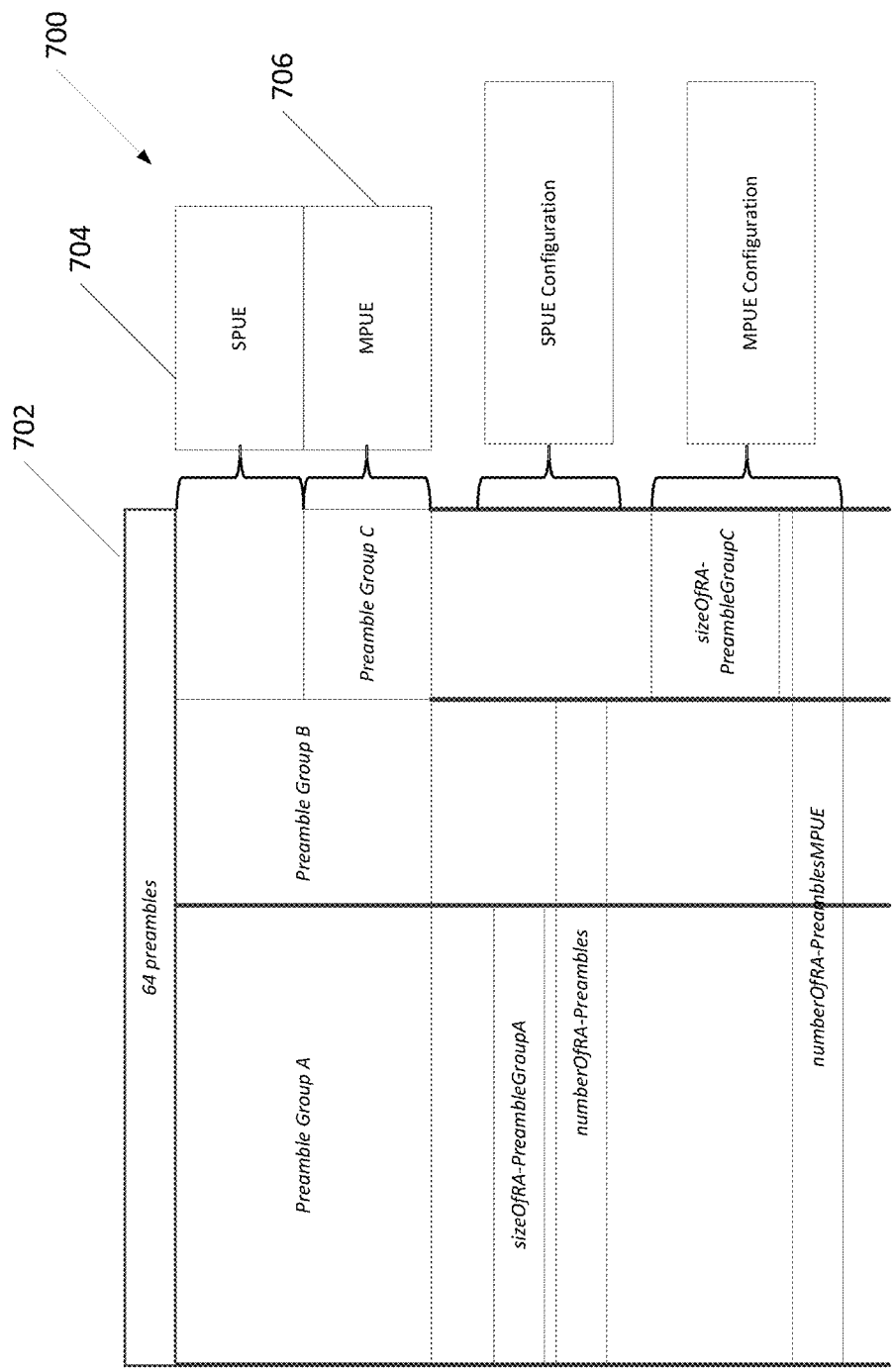
FIG. 7 illustrates an example configuration for distributing RACH preambles.

In an example, a WTRU may be configured to determine a subset of preambles to be used with a second set of PRACH resources based on preamble group-division of preamble assignments in a serving cell. In an example, preamble grouping (e.g., preamble group C of FIG. 7) may be achieved according to various criteria. For example, preamble grouping may be based on a preamble configuration as seen by the network. For example, both cell-specific and WTRU-specific preambles may be grouped based on a preamble configuration as seen by the network. In an example, the network may reserve a number of preambles for use by MPUEs, and in an example the preambles reserved for MPUEs may not be used by SPUEs. For example, the network may reserve a group of preambles (e.g., preamble group C of FIG. 7) of sizeOfRA-PreambleGroupC for a given set of PRACH resources in a serving cell. FIG. 7 illustrates preamble grouping in an example configuration 700 for distributing RACH preambles.

For example, there may be 64 possible preambles 702. The network may configure SPUEs 704 with up to 64-sizeOfRA-PreambleGroupC preambles. The SPUEs 704 preambles may be spread across group A and group B (if configured), for example, according to R10 methods.

The network may then also configure MPUEs 706 with up to 64 preambles, which may be spread across group A, group B, group C, and/or any combination thereof. For example, a plurality of preambles may be spread across group A and group B (if configured) according to R10 methods, with additionally up to sizeOfRA-PreambleGroupC preambles in group C. In an example, a WTRU may be configured with a set of preambles that may be selected for transmission in the second set of PRACH resources, but not in the first set of PRACH resources.

In an example, preamble grouping may be based on a preamble configuration as seen by the WTRU. For example, a SPUE 704 may be configured according to existing methods, and a MPUE 706 may be configured with additional parameters such that the MPUE 706 may derive an additional group of preambles. When the WTRU may select a preamble for a transmission for data and/or events that correspond to a second set of PRACH resources, the WTRU may select a preamble in group C for the corresponding resource.

In an example, a SPUE 704 may be configured such that sizeOfRA-PreambleGroupA≤numberOfRA-Preambles. For example, preambles in group A may be each of the available preamble, for example if group B is not configured. However, if group B is configured for a SPUE, the Preamble Group A may range from preamble index [0, sizeOfRA-PreamblesGroupA−1], and Preamble Group B may range from index [sizeOfRA-PreamblesGroupA, numberOfRA-Preambles−1]. In an example, the network may allocate preambles such that the total number of preambles 702 available to the SPUEs 704 may be less than 64. For example, the number of preambles allocated to SPUEs 704 may be the difference between the total number of preambles and the number of preambles to be allocated to WTRUs that may support additional behavior for random access procedure (e.g., MPUEs 706). For example:

$$\text{numberOfRA-Preambles (SPUE)} + \text{sizeOfRA-PreambleGroup}C \text{ (MPUE)} \leq 64 \quad (4)$$

In an example, a SPUE may not be configured with a value for sizeOfRA-PreambleGroupC, and instead may be configured with the parameter numberOfRA-Preambles.

In an example, an MPUE 706 may be configured with specific preambles. For example, an MPUE 706 may be configured with a number of random access preambles that may be available for the MPUE 706 in the given cell. For example, an MPUE 706 may be configured with a number of additional preambles (e.g., sizeOfRA-PreambleGroupC), from which the WTRU may implicitly determine the maximum number of preambles available. In an example, an MPUE 706 may be configured with a value (e.g., numberOfRA-PreamblesMPUE) that may supersede that of the parameter numberOfRA-Preambles. For example, an MPUE 706 may be configured with a value (e.g., numberOfRA-PreamblesMPUE) that may supersede that of the parameter numberOfRA-Preambles as common configuration information for the cell. The common configuration information for the cell may be received from broadcasted system information and/or by dedicated signaling in a common configuration (e.g., RACH-ConfigCommon).

If a MPUE 706 is configured with a value (e.g., numberOfRA-PreamblesMPUE), the WTRU may derive the value for sizeOfRA-PreambleGroupC, for example using numberOfRA-PreamblesMPUE−numberOfRA-Preambles. The total number of preambles available may be equal to or less than 64. For example, numberOfRA-Preambles+sizeOfRA-PreambleGroupC may represent the total number of preambles. In an example, numberOfRA-PreamblesMPUE may represent the total number of available preambles. An MPUE 706 may be configured with a non-zero preamble group B, for example, where:

$$\text{sizeOfRA-PreambleGroup}A \leq \text{numberOfRA-PreamblesMPUE} - \text{sizeOfRA-PreambleGroup}C \quad (5)$$

In an example, if a preamble group B exists, then an MPUE 706 may be configured such that the ranges of the groups of preambles may be:
Preamble Group A: [0, sizeOfRA-PreamblesGroupA−1];
Preamble Group B: [sizeOfRA-PreamblesGroupA, numberOfRA-Preambles−1];
Preamble Group C: [numberOfRA-Preambles, numberOfRA-Preambles+sizeOfRA-PreambleGroupC−1].

In an example, if a preamble group B exists, then an MPUE 706 may be configured such that the ranges of the groups of preambles may be:
Preamble Group A: [0, sizeOfRA-PreamblesGroupA−1];
Preamble Group B: [sizeOfRA-PreamblesGroupA, numberOfRA-PreamblesMPUE−numberOfRA-Preambles−1];
Preamble Group C: [numberOfRA-PreamblesMPUE−numberOfRA-Preambles, numberOfRA-PreamblesMPUE−1].

If Group B is not configured, the last sizeOfRA-PreambleGroupC preambles of the total number of available preambles may correspond to preamble group C. Preamble grouping where one group of preambles may be dedicated to a second set of PRACH resources may be used to limit contention between SPUEs 704 and MPUEs 706. Grouping preambles may be used in combination with other methods described herein. For example, grouping preambles may be used in combination with a PRACH Mask Index.

A WTRU may be configured such that the preamble format that may correspond to a second set of PRACH resources may use a different sequence length than that of a first set. For example, the WTRU may use a longer $T_{seq}$ (e.g., 1.6 ms) to transmit more than 6 bits of preamble information. In an example, the WTRU may include two different sequences in the preamble format, where each sequence may be of equal length (e.g., 0.8 ms in length). In an example, a second sequence may be included when the WTRU uses a longer preamble format (e.g., a 2 ms or 3 ms preamble). For example, the WTRU may use a preamble format that is specific to the concerned set of PRACH resources, and the format may be associated with a longer sequence length.

For example, the WTRU may use the additional $T_{seq}$ length to extend the range of the preamble space. Extending the sequence length and/or extending the range of the preamble space may be used to multiplex multiple MPUEs 706 in the same (e.g., and/or small or limited) set of PRACH resources spread in time. For example, an extended sequence length and/or an extended range of the preamble space may be used in combination with methods that limit the rate of initial preamble transmission. For example, such a scheme may allow multiple populations of WTRUs to share the same set of PRACH resources. The shared set of resources may be used for RACH procedures of lower priority while using a dedicated preamble to emulate a dedicated PRACH with relaxed latency requirements.

In LTE, for preamble format 2 and 3, the sequence (0.8 ms) may be repeated once in the transmission of the preamble. Formats 2 and 3 may be used to ensure that the receiver may receive a sufficient amount of energy, for example in the case of large cell deployment. Formats 2 and 3 may use a larger cyclic prefixes. In an example, instead of repeating the same sequence, a WTRU may be configured use a second sequence in the preamble format, such that the WTRU may provide additional information in the transmission of a preamble. For example, the additional information may include the priority of the random access procedure. For example, the additional information may include the amount of data that is available in the buffer of the WTRU for transmission. For example, the additional information may include an identity of the WTRU that performed the preamble transmission (e.g., if a dedicated preamble is used). For example, the additional information may include a WTRU group identity. For example, the additional information may include a WTRU state (e.g., whether or not the screen is on, or similar). In an example, the WTRU may receive a MSG2 message (e.g., RAR) that may correspond to a preamble transmitted with a second sequence in the preamble format. The response may echo the second sequence, for example, for the RAR message using the Temporary C-RNTI field.

Although other physical layer configurations may be contemplated within the scope of numerous examples (e.g., a smaller number and/or larger number of consecutive/non-consecutive physical resource blocks may be used for preamble transmission), a PRACH resource may include six consecutive resource blocks. In an example, a second set of PRACH resources may use a different number of PRBs. In LTE, the random access format may be designed to ensure good detection probability such that a sufficient amount of energy may be collected at the receiver (e.g., a sufficient number of PRBs allocated to preamble transmission), while ensuring that interference in the system may not be overly increased due to timing misalignment (e.g., cyclic prefix, guard). The random access format may also be configured to ensure that false detection due to Doppler effects may be reduced or minimized (e.g., cyclic shift and sequence length).

Assuming that for a given set of PRACH resources, such characteristics may be less important than adding increased flexibility to the system, for example, while still allowing for the detection of a sufficiently large fraction of the preambles transmitted by WTRUs in a given coverage area, then one possibility to reduce or minimize the overhead of allocating additional PRACH resources may be to allocate fewer physical resource blocks for the PRACH resources of a second set.

For example, allocating three PRBs may lead to 36 data subcarriers with 15 kHz subcarrier spacing. The number of available subcarriers/data bits in this case may be 432. 432 is not a prime number, and a prime number of available subcarriers/data bits may increase or maximize the number of available sequences. Considering a guard band similar as that of LTE R10 preamble formats (e.g., using 25 subcarriers with spacing of 1.25 kHz), in this case 23 subcarriers with spacing of 1.25 kHz may be used, and the number of available subcarriers/data bits may become 409. The resulting possible random access preamble length in this case may be Nzc=409. In an example, utilizing fewer PRBs may be based on a determination that the PRBs that correspond to the second set of PRACH resources are mutually exclusive to the set of PRBs that corresponds to a first set of PRACH resources. In an example, utilizing fewer PRBs may be based on a determination that the sets of PRACH resources utilized set-specific RACH configurations, for example, if the sets utilized set specific preamble transmission power settings.

A WTRU may be configured to handle RACH failure on a second set of PRACH resources. For example, a WTRU may reach a number of (e.g., the maximum number of) preamble transmissions for the second set of PRACH resources, for example, without determining that the procedure was successful. In an example, the WTRU may determine that the RACH procedure is unsuccessful based on the WTRU reaching the maximum number of preamble transmission for the second set of PRACH resources without determining that the procedure was successful. The WTRU may simply stop preamble transmission without further actions (e.g., MAC may refrain from notifying RRC of the unsuccessful RACH procedure). In an example, if the WTRU determines that the RACH procedure was unsuccessful on the second set of PRACH resources, the WTRU may declare UL RLF.

In an example, the WTRU may additionally perform one or more of the following for a RACH procedure that is unsuccessful for preamble transmissions associated with a second set of PRACH resources. In an example, upon a determination that a RACH procedure for a second set of PRACH resources was unsuccessful, a WTRU may initiate a RA-SR on a different set of PRACH resources. For example, the WTRU may initiate a RA-SR of a first set of resources, for example, after a backoff time. The back off time may be used if no backoff indication (BI) and/or no congestion indication is received. In an example, upon a determination that a RACH procedure for a second set of PRACH resources was unsuccessful, a WTRU may initiate a RA-SR on a different set of PRACH resources (e.g., on a first set of resources) after a maximum number of consecutive unsuccessful attempts for a RACH procedure using the second set of PRACH resources and/or after a maximum amount of time during which a plurality of attempts have not succeeded. For example, the counting and/or timer may be reset if any other successful dedicated transmission occurs and/or any other RACH procedure successfully completes for the WTRU. In an example, upon a determination that a RACH procedure for a second set of PRACH resources was unsuccessful, a WTRU may transmit the first preamble on the second set of resources using the power level of the last attempt using a resource of the second set.

The WTRU may receive a configuration message that includes information for the WTRU to determine additional PRACH resources. As described herein, in some examples, the configuration signaling may structure the additional PRACH resources in corresponding sets of resources for a given serving cell. The WTRU may receive such configuration in dedicated signaling (e.g., in a RRC Reconfiguration message with or without the mobilityControlInformation IE) and/or on a BCCH in the broadcasted system information for the cell as part of the SI acquisition procedure. In an example, configuration of multiple sets of PRACH resources may be permitted for a primary serving cell (PCell) and not in a secondary severing cell (SCell). In an example, the WTRU configuration may be applied to one or more secondary serving cells (SCell) for carrier aggregation, for example when a WTRU is in a RRC_CONNECTED state.

Combinations of the following are possible, where, for example, a first set may correspond to a configuration received on a broadcast channel, and a second set may be received by dedicated signaling. In an example, the signaling described and/or the use of a second set of PRACH resources may be allowed after some form of activation. For example, the use of a second set of PRACH resources may be allowed after entering a substate of the RRC_CONNECTED state and/or upon some trigger (e.g., a trigger that activates procedures for dormancy).

The WTRU may use one or more of the following methods to configure additional PRACH resources. For example, a WTRU may receive a configuration with multiple PRACH-Config IEs for a given serving cell (e.g., multiple PRACHs). For example, a WTRU may receive a configuration with a second configuration for PRACH and/or with a corresponding configuration for RACH. Sending a second configuration may allow the extension part of an existing messaging to remain the same, and hence may be relatively simple to introduce. Sending a second configuration may create a completely separate PRACH channel, and the corresponding resources may be made to partly overlap with the first PRACH channel. For example, such a configuration (e.g., rach-ConfigCommon-lowPrio-v12x0, and/or prach-Config-lowPrio-v12x0) may be included as part of a non-critical extension in the RadioResourceConfigCommonSIB IE and/or as part of the RadioResourceConfigCommon IE, as shown as an example information element 800 of FIG. 8 and an example information element 900 of FIG. 9, respectively.

For example, if one of the parameters of the second PRACH configuration (e.g., the PRACH-Config-lowPrio-v12x0 above) is not present, the WTRU may use the corresponding parameter configured for the first PRACH configuration. In other words, if prach-ConfigIndex is not present, additional resources (e.g., possibly the second set of PRACH resources) may be realized by adding PRACH resources in the frequency domain using prach-FreqOffset. If prach-FreqOffset is not present, additional resources (e.g., possibly the second set of PRACH resources) may be realized by adding PRACH resources in the time domain using prach-ConfigIndex.

For example, a WTRU may receive a configuration with an alternative mapping table for prach-ConfigIndex. For example, adding resources (e.g., possibly to realize a second set of PRACH resources) in the time domain may be realized by redefining the meaning of the signaled configuration index (e.g., prach-ConfigIndex). This could be achieved, for example, by including an indication that the WTRU may use the alternative mapping table. Such an indication may be part of a dedicated configuration. For example, the indication in the RadioResourceConfigCommon IE may be shown in an example information element 1000 of FIG. 10.

In an example, another method to add resources (e.g., possibly to realize a second set of PRACH resources) in the time domain may be to extend the range of the configuration index (e.g., prach-ConfigIndex). Additional bits may be introduced, for example, for a dedicated configuration as described herein. In an example, the extended range may be used to specify a first and a second set of resources on the PRACH of the given cell. FIGS. 11 and 12 illustrate example information elements 1100 and 1200 that may be used to specify these sets of resources.

In an example, a WTRU may receive a configuration with multiple prach-ConfigIndex and/or multiple prach-FreqOffset for a PRACH-ConfigInfo. For example, the WTRU may receive a configuration with a second set of configuration parameters (e.g., prach-ConfigIndex) in the time domain for the PRACH channel. For example, the WTRU may receive a configuration with a second set of configuration parameters (e.g., prach-FreqOffset) in the frequency domain for the PRACH channel. For example, such a configuration may be realized by including an IE in the non-critical extension in the RadioResourceConfigCommonSIB IE and/or in the RadioResourceConfigCommon IE, as shown at an information element 1300 of FIG. 13. The IE may supersede (as shown, except for rootSequenceIndex) and/or extend the signaled prach-Config IE, as shown at an information element 1400 of FIG. 14, appearing in that same IE.

Such a method may keep a single PRACH channel (e.g., including that a single root index that may be used to generate the set of allocated preambles) in the serving cell while possibly extending the set of available resources (e.g., possibly to realize a second set of PRACH resources). Such a signaling method may cause the configuration parameters of the PRACH channel to be separated into different IEs. The signaling may use the extension part of an existing message to indicate that there are PRACH-related parameters in addition to those already signaled in the fixed part of the message.

In an example, the WTRU may receive a configuration with additional parameters for multiplexing in frequency and/or time domain. For example, the WTRU may receive a configuration with parameters that define additional resources, for example structured as a second set of PRACH resources. For example, such a configuration may be realized by including an IE in the non-critical extension in the RadioResourceConfigCommonSIB IE and/or in the RadioResourceConfigCommon IE, as shown at an example information element 1500 of FIG. 15. The IE may supersede (as shown at an example information element 1600 of FIG. 16, except for rootSequenceIndex) or extend the signaled prach-Config IE appearing in that same IE. Such a method may maintain a single PRACH channel.

In an example, a WTRU may perform frequency multiplexing of PRACH resources in a PRACH occasion. For example, the PRACH configuration for frame structure 1 may be associated with a density value, for example per 10 ms. Any resource added in the frequency domain may be associated with a first or to a second set. The WTRU, given a density (e.g., associated with the PRACH configuration index), may allocate resources in time first and then in frequency if the density cannot be met for the density value. In an example, the first resource block for the PRACH may be based on signaled SFN period (e.g., SFN mod X=0), with a first PRB in a given subframe 0 and/or in given in frequency in that subframe, for example as (PRB offset+6* (frequency resource index/2) if fra mod 2=0).

Such a scheme may be achieved by signaling "fra" for a given PRACH occasion. The desired density may then be used by a WTRU to allocate one extra PRACH opportunity in given PRACH occasion(s).

In an example, a WTRU may allow more than one PRACH version. PRACH version may denote PRACH configurations with the same density but with different subframe allocations. Different versions may enable processing load distribution in an eNodeB PRACH receiver serving multiple cells and non-overlapping PRACH slots in neighboring cells. For example, in FDD different versions may occupy different subframes, and in TDD several versions may occupy the same subframes but different frequencies.

In an example, a WTRU may perform transmission of a preamble for a purpose other than to acquire resources for an uplink transmission. For example, the WTRU may determine that the preamble transmission is performed for the purpose of proximity or range detection, to implement a keep-alive function, or a similar function. This may be useful, for example, in a case in which a network node (e.g., an eNB) may implement a dormancy or a power saving state. In such a state, the eNB refrain from transmitting one or more signals in the downlink, perhaps refraining from transmitting any signals in the downlink (e.g., when there is no WTRU to serve under the serving area of the eNB and/or of the cell). This may also be useful in a case in which a network node (e.g., an eNB) supports one or more cells in a frequency for which a WTRU does not perform measurements (e.g., in a high frequency band), but where the system may benefit from detecting proximity between a WTRU and the eNB in question (e.g., millimeter wave (mmW) bands). For example, this may be useful in a system with multiple layers (e.g., with cells possibly originating from different eNBs and/or in different frequency bands) where a cell or some cells (e.g., of a smaller coverage area) may overlap with one or more macro cells.

For example, the WTRU may initiate the transmission of a preamble on a specific set of PRACH resources, for example using one or more of the methods disclosed herein. The transmission of the preamble may be initiated from the reception of downlink control signaling from the network. Such signaling may include a DCI received on the PDCCH and/or the enhanced-PDCCH (E-PDCCH), which DCI may trigger a WTRU to perform the preamble transmission. For example, such signaling may include a paging message. In an example, the signaling may also include an indication that the request is for a specified function (e.g., a "keep-alive" or a proximity detection function) in which uplink resources may not be granted as part of the procedure. The indication may be implicit or explicit. For example, an explicit indication may include a field in the received control signaling that includes or indicates the indication. As another example, an implicit indication may be determined from the combination of the parameters indicated for the preamble transmission in the received control signaling and/or the configuration of the PRACH resources for the WTRU. For example, the WTRU may determine that the indicated parameters correspond to a second set of PRACH resources in the configuration of the WTRU.

In this case, the WTRU refrain from autonomously performing a retransmission of the preamble. The WTRU may perform the retransmission of a preamble if subsequent control signaling is received that triggers the transmission of a preamble, for example, using the same set of PRACH resources, possibly with a different power level than for the previous transmission. The WTRU may determine whether the preamble transmission is an initial transmission or a retransmission if the control signaling is received within a certain time from the previous control signaling (e.g., within a signaling window).

If the WTRU determines that a preamble corresponds to a retransmission, the WTRU may apply power ramping, for example up to the maximum allowed power for the concerned PRACH configuration. The power level or the amount of power ramping to apply to the transmission of the preamble may be derived from an indication in the received control signaling. The power level may be configured with the corresponding PRACH configuration (e.g., it may be of a fixed value and it may correspond to the maximum allowed power for this PRACH configuration). For example, the WTRU may receive such configuration for the purpose of the "keep alive" or proximity detection function, with a power level that may correspond to the maximum coverage of the cells in a given frequency layer.

If a preamble is transmitted according to any of the above methods, the WTRU may refrain from monitoring for a RAR using RA-RNTI.

The configuration of the set of PRACH resources for such functionality may correspond to resources of a first eNB, for example, of the (e.g., macro) cell to which the WTRU is already connected, in which case it may be assumed that a second network node (e.g., supporting a layer of a small cell or small cells) that may implement a dormancy or a power saving state may monitor the PRACH resource on the frequency of a cell of the first eNB. In an example, the PRACH resources may correspond to resources of a cell of the second network node (e.g., if the second network node monitors the concerned PRACH resources while in a dormant or power saving state).

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method for detecting cell congestion in a wireless communication network, the method comprising:
    selecting, at a wireless transmit/receive unit (WTRU), a Physical Random Access Channel (PRACH) resource set out of a plurality of PRACH resource sets, wherein each PRACH resource set of the plurality of PRACH resource sets comprises one or more physical resource block (PRBs) that can be used for a preamble transmission, and each of the plurality of PRACH resource sets is associated with a priority level;
    sending, from the WTRU, a preamble transmission to a cell during a random access procedure using one of the selected PRACH resource set;
    determining, at the WTRU, whether the WTRU received a Random Access Response (RAR); and
    determining, at the WTRU, a congestion state of the cell based on at least:
        the priority level of the selected PRACH resource set utilized for the preamble transmission, and
        at least one of whether the WTRU received a RAR or information included in the RAR when the WTRU receives the RAR.

2. The method of claim 1, wherein one or more of a random access channel (RACH) preamble used for the preamble transmission or a transmission opportunity used for the preamble transmission is selected based on a priority level of data to be transmitted to the cell during the random access procedure.

3. The method of claim 1, further comprising:
    attempting to decode the RAR using a plurality of Random Access Radio Network Temporary Identifiers (RA-RNTIs), wherein decoding a transmission with a first RA-RNTI of the plurality of RNTIs is an indication of network congestion; and
    determining that the cell is in the congested state if the RAR is successfully decoded using the first RA-RNTI.

4. The method of claim 1, further comprising:
    attempting to decode the RAR over a plurality of RAR windows; and
    determining that the cell is in the congested state if the RAR is successfully decoded in a particular RAR window of the plurality of RAR windows.

5. The method of claim 1, further comprising:
    decoding the RAR to determine a value of a Temporary Cell Radio Network Temporary Identifier (C-RNTI) field, wherein a predetermined value of the C-RNTI field is used to indicate network congestion; and
    determining that the cell is in the congested state if the Temporary C-RNTI field comprises the predetermined value.

6. The method of claim 1, wherein the WTRU fails to receive the RAR, and the method further comprises determining that the network is in the congested state based on the WTRU failing to receive the RAR and one or more of a random access channel (RACH) preamble used for the preamble transmission or a transmission opportunity used for the preamble transmission.

7. The method of claim 1, further comprising:
attempting to decode one or more physical downlink control channel (PDCCH) transmissions using a physical random access channel (PRACH) Radio Network Temporary Identifier (PR-RNTI), wherein transmissions that are successfully decoded using the PR-RNTI comprise an indication of resources to be used for subsequent random access procedures.

8. The method of claim 1, further comprising, in response to determining that the cell is in the congested state, performing one or more of:
aborting a Non-Access Stratum (NAS) Service Request;
aborting an ongoing Radio Resource Control (RRC) procedure;
aborting an ongoing RRC connection establishment procedure;
canceling transmission of data associated with an event that triggered the random access procedure;
applying a backoff period before attempting a subsequent random access procedure;
initiating a cell reselection procedure to select a different serving cell;
performing a measurement to determine whether a failure to receive the RAR is due to cell congestion or due to a poor radio link quality;
initiating an alternative transmission method; or
initiating a dormant behavior.

9. The method of claim 1, wherein sending the preamble transmission from the WTRU comprises indicating priority information in the preamble transmission.

10. The method of claim 9, wherein the priority information is indicated using one or more of a preamble type selection, a preamble selection, a random preamble selection, a preamble value selection, a preamble group selection, a Physical Random Access Channel (PRACH) selection, a PRACH opportunity, a PRACH length, or a preamble length selection.

11. The method of claim 1, further comprising:
receiving a physical random access channel (PRACH) configuration, wherein the PRACH configuration comprises a PRACH Radio Network Temporary Identifier (PR-RNTI); and
attempting to decode a Physical Downlink Control Channel (PDCCH) using the PR-RNTI, wherein grants for higher priority random access procedures are successfully decoded using the PR-RNTI.

12. The method of claim 1, wherein the RAR indicates a level of congestion.

13. The method of claim 1, further comprising:
receiving a PRACH configuration; and
configuring the plurality of PRACH resource sets based at least in part on the received PRACH configuration.

14. A wireless transmit/receive unit (WTRU) comprising:
a transceiver; and
a processor configured to:
select, at the WTRU, a Physical Random Access Channel (PRACH) resource set out of a plurality of PRACH resource sets, wherein each PRACH resource set of the plurality of PRACH resource sets comprises one or more physical resource block (PRBs) that can be used for a preamble transmission, and each of the plurality of PRACH resource sets is associated with a priority level;
send, via the transceiver, a preamble transmission to a cell during a random access procedure using one of the selected PRACH resource set;
determine, at the WTRU, whether the WTRU received a Random Access Response (RAR); and
determine, at the WTRU, a congestion state of the cell based on at least:
the priority level of the selected PRACH resource set utilized for the preamble transmission, and
at least one of whether the WTRU received a RAR or contents of the RAR when the WTRU receives the RAR.

15. The WTRU of claim 14, wherein the processor is further configured to determine the congestion state of the cell as a function of the RAR.

16. The WTRU of claim 14, wherein the processor is further configured to determine a preamble group to use for selection of a Random Access Channel (RACH) preamble used for the preamble transmission based on a priority level of uplink data to be transmitted during the random access procedure.

17. The WTRU of claim 14, wherein the processor is further configured to select from a subset of available Physical Random Access Channel (PRACH) resources for the preamble transmission.

18. The WTRU of claim 17, wherein the subset of available PRACH resources determined as a function of one or more of a system frame number (SFN), a PRACH mask index, or a discontinuous reception (DRX) property.

19. The WTRU of claim 14, wherein the processor is further configured to:
decode the RAR; and
determine that the cell is in the congested state if the RAR includes an indication of congestion in a padding field of the RAR.

20. The WTRU of claim 14, wherein the RAR includes a zero-size uplink grant and the processor is further configured to determine that the cell is in the congested state based on the RAR including the zero-size uplink grant and a low priority being indicated in the preamble transmission.

21. The WTRU of claim 14, wherein sending the preamble transmission from the WTRU comprises indicating priority information in the preamble transmission using one or more of a preamble type selection, a preamble selection, a random preamble selection, a preamble value selection, a preamble group selection, a Physical Random Access Channel (PRACH) selection, a PRACH opportunity, a PRACH length, or a preamble length selection.

22. The WTRU of claim 14, wherein the processor is further configured to:
receive a PRACH configuration; and
configure the plurality of PRACH resource sets based at least in part on the received PRACH configuration.

23. The WTRU of claim 14, wherein a first PRACH resource set is utilized for low priority random access procedures and a second PRACH resource is utilized for high priority random access procedures.

24. The WTRU of claim 14, wherein the RAR indicates a level of congestion.

* * * * *